(12) United States Patent
Mukai

(10) Patent No.: US 12,471,773 B2
(45) Date of Patent: Nov. 18, 2025

(54) SENSORY TRAITS INFORMATION COLLECTING METHOD AND SENSORY TRAITS INFORMATION COLLECTING DEVICE

(71) Applicant: KUNKASHA CO., LTD., Osaka (JP)

(72) Inventor: Tadashi Mukai, Osaka (JP)

(73) Assignee: KUNKASHA CO., LTD., Osaka (JP)

(*) Notice: Subject to any disclaimer, the term of this patent is extended or adjusted under 35 U.S.C. 154(b) by 0 days.

(21) Appl. No.: 18/707,521

(22) PCT Filed: Apr. 6, 2023

(86) PCT No.: PCT/JP2023/014168
§ 371 (c)(1),
(2) Date: Feb. 24, 2025

(87) PCT Pub. No.: WO2023/204034
PCT Pub. Date: Oct. 26, 2023

(65) Prior Publication Data
US 2025/0185907 A1   Jun. 12, 2025

(30) Foreign Application Priority Data

Aug. 8, 2022 (JP) ................. 2022-126262
Sep. 20, 2022 (JP) ................. 2022-149096

(51) Int. Cl.
*A61B 3/06* (2006.01)
*A61B 3/00* (2006.01)
*A61B 3/024* (2006.01)

(52) U.S. Cl.
CPC ............ *A61B 3/063* (2013.01); *A61B 3/0041* (2013.01); *A61B 3/024* (2013.01)

(58) Field of Classification Search
CPC ........ A61B 3/063; A61B 3/0041; A61B 3/024
(Continued)

(56) References Cited

U.S. PATENT DOCUMENTS

2003/0223036 A1   12/2003  Anderson et al.
2005/0177862 A1*   8/2005  Chen .................. H04N 21/4722
                                                              725/135
(Continued)

FOREIGN PATENT DOCUMENTS

CN   105765358 A   7/2016
CN   110546551 A   12/2019
(Continued)

OTHER PUBLICATIONS

Brannan et al., "Effect of Luminance on Visual Evoked Potential Amplitudes in Normal and Disabled Readers," Optometry and Vision Science, Apr. 1998, 75(4):279-283.
(Continued)

*Primary Examiner* — Mohammed A Hasan
(74) *Attorney, Agent, or Firm* — Womble Bond Dickinson (US) LLP

(57) ABSTRACT

A sensory traits information collecting method includes: a first viewed-object presenting step of presenting one or more viewed objects (30) including a predetermined visibility element (31, etc.) to a subject in a white light environment in which white light (L0) is incident on a retina (R) of the subject; a predetermined light environment creating step of creating a predetermined light environment in which predetermined light (L1) different from the white light (L0) in at least one of spectral distribution and luminance is incident on the retina (R) of the subject; a second viewed-object presenting step of presenting the viewed object (30) to the subject again in the predetermined light environment; an information reception step of receiving sensory traits information related to the way of seeing of the viewed object (30) in the first viewed-object presenting step and the second viewed-object presenting step; and a collecting step of
(Continued)

collecting the sensory traits information received from the subject.

20 Claims, 13 Drawing Sheets

(58) Field of Classification Search
USPC .......................................................... 351/222
See application file for complete search history.

(56) References Cited

U.S. PATENT DOCUMENTS

| | | | |
|---|---|---|---|
| 2005/0213040 A1 | 9/2005 | Gross et al. | |
| 2013/0342810 A1* | 12/2013 | Nishiwaki | A61B 8/10 351/205 |
| 2015/0174916 A1* | 6/2015 | Hara | B41J 3/60 347/110 |
| 2018/0247108 A1* | 8/2018 | Hong | G06F 3/0488 |
| 2018/0289250 A1* | 10/2018 | Wilkins | A61B 3/0008 |
| 2020/0380581 A1* | 12/2020 | Shibata | G06Q 30/0631 |
| 2021/0400020 A1* | 12/2021 | Lazri | H04L 45/54 |

FOREIGN PATENT DOCUMENTS

| | | |
|---|---|---|
| JP | S61-94013 U | 6/1986 |
| JP | 2002-253509 | 9/2002 |
| JP | 2012-35067 | 2/2012 |
| JP | 2015-102463 | 6/2015 |
| WO | 2017072496 A1 | 5/2017 |

OTHER PUBLICATIONS

Noble et al., "A Controlled Field Study of the Use of Coloured Overlays on Reading Achievement," Aus. J. Learn. Disabilit., Jun. 2004, 9(2):14-22.
Sato et al., "Study on visual function of people with Irlen Syndrome," Jpn. J. Learn. Disabilit., 2021, 30(2): 126-137 (including English translation).
International Search Report issued Jun. 13, 2023, in PCT/JP2023/014168 (including English translation).
Na and Suk, "Adaptive luminance contrast for enhancing reading performance and visual comfort on smartphone displays," Optical Engineering, Nov. 2014, 53(11):113102, 8 pp.
European Office Action issued Mar. 12, 2025, in EP23791685.3.
Search Report issued Apr. 29, 2025, in Chinese Patent Application No. 202380037846.X (including English translation).

* cited by examiner

| Question Item | 5 Very | 4 Somewhat | 3 No Change | 2 Somewhat | 1 Very | |
|---|---|---|---|---|---|---|
| 1 Way of seeing Became Better | O | O | O | O | O | Way of seeing Became Worse |
| 2 It Became Easier To See Around | O | O | O | O | O | It Became Harder To See Around |
| 3 The Entirety Became Brighter | O | O | O | O | O | The Entirety Became Darker |
| 4 The Glare Became Weaker | O | O | O | O | O | The Glare Became Stronger |
| 5 Became Clear | O | O | O | O | O | Became Blurry |
| 6 Brightness Became Darker | O | O | O | O | O | Brightness Became Lighter |
| 7 Color Became More Vivid | O | O | O | O | O | Color Became Duller |
| 8 Irregularity Became Deeper | O | O | O | O | O | Irregularity Became Shallower |
| 9 Gloss/Shadow Became Stronger | O | O | O | O | O | Gloss/Shadow Became Weaker |

Score ← 
Choice Evaluation Scale ←
Adjective Pair ↑
Check Button ↑
Adjective Pair ↑

FIG. 12

SENSORY TRAITS INFORMATION COLLECTING METHOD AND SENSORY TRAITS INFORMATION COLLECTING DEVICE

RELATED APPLICATIONS

The present application is a U.S. national phage entry of the International Application No. PCT/JP2023/014168 filed Apr. 6, 2023, which claims the benefit of priority to Japanese Application No. JP2022-126262 filed Aug. 8, 2022, and Japanese Application No. JP2022-149096 filed Sep. 20, 2022. The entire contents of each of the foregoing applications are hereby incorporated herein by reference.

TECHNICAL FIELD

The present invention relates to a sensory traits information collecting method and a sensory traits information collecting device for collecting sensory traits information on a subject's sense of sight.

BACKGROUND ART

Learning Disorder (Specific Learning Disorder) is a condition in which an individual has difficulty learning a task in a specific area, even though his or her general intelligence is within the normal range, his or her vision (visual acuity) and hearing (auditory acuity) are not impaired, and there are no problems with the learning environment or motivation of the individual. There are various types of Learning Disorder, including Dyslexia, Dysgraphia, and Dyscalculia. Moreover, others are poor at or have difficulty with visuospatial cognition (the ability to accurately perceive the form and location of objects, including their position, shape, direction, and size).

Some individuals with Learning Disorder assert "the letters are shaking", "the text is wavy", or "the surface of the paper is shiny". Such symptoms are called Irlen Syndrome, Meares-Irlen syndrome, or visual stress. It is known that these symptoms (Sense of sight: Vision) can be improved by using colored films and lenses. In particular, the use of colored lenses and films is effective for Irlen syndrome (see Non-Patent Literature 1 and 2).

Thus, Irlen Syndrome and other likely disorders are thought to be potentially related to visual perception (bias in visual cognition function), particularly photosensitivity.

CITATION LIST

Non-Patent Literature

[Non-Patent Literature 1] Sandra Irlen et al., "A controlled field study of the use of coloured overlays on reading achievement", Australian Journal of Learning Disabilities, Volume 9, 2004-Issue 2, Pages 14-22

[Non-Patent Literature 2] Keiko Kumagai et al., "The Research of Visual Characteristics of the Clients with Irlen Syndrome", Japanese Journal of Learning Disabilities, 2021 Volume 30 Issue 2, Pages 126-137

SUMMARY OF INVENTION

Technical Problem

As mentioned above, individuals with biased visual cognitive function (photosensitivity) may have a "sense of sight" that differs from that of healthy individuals. However, since they are born with this "sense of sight", it is difficult for them to realize that they are not normal. Thus, there are many people with biased visual cognitive function, even among those who are called to be healthy people.

Nevertheless, visual cognitive biases cannot be dealt with in hospitals and are only assessed in a few limited research facilities. Moreover, symptoms of bias in visual cognitive function vary widely, and there are large individual differences. Therefore, only those with specialized knowledge and experience can assess the biases of visual cognitive function.

Various self-check tests have been published for the early detection of biases in visual cognitive function [Irlen Self-Test: https://irlen.com/get-tested/].

However, the self-check tests are strongly influenced by the subjectivity (preconception or vanity) of the individual. In addition, because the individual himself/herself is often unaware of the bias in visual cognitive function, it is extremely difficult to diagnose it using only a self-check test.

Therefore, there is a great need to establish a method for early detection of bias in the visual cognitive function (photosensitivity) of a subject, without relying on a person having specialized knowledge or the like, and eliminating the subjectivity of the subject as much as possible. As one of the prerequisites (preliminary steps) for establishing such a method, it is necessary to develop a method for collecting sensory trait information about the subject's sense of sight.

Because of the above circumstances, the purpose of the present invention is to provide a sensory trait information collecting method and a sensory trait information collecting device capable of collecting the sensory trait information of the subject's sense of sight.

Solution to Problem

A first aspect of a sensory traits information collecting method according to an embodiment of the present invention includes: a first viewed-object presenting step of presenting one or more viewed objects including a predetermined visibility element to a subject in a white light environment in which white light is incident on a retina of the subject: a predetermined light environment creating step of creating a predetermined light environment in which predetermined light different from the white light in at least one of spectral distribution and luminance is incident on the retina of the subject: a second viewed-object presenting step of presenting the viewed object to the subject again in the predetermined light environment: an information reception step of receiving from the subject sensory traits information related to the way of seeing of the viewed object in the first viewed-object presenting step and the second viewed-object presenting step: and a collecting step of collecting the sensory traits information received from the subject.

A second aspect of the sensory traits information collecting method is that of the first aspect including an aggregation step of aggregating the information obtained in the collecting step.

A third aspect of the sensory traits information collecting method is that of the second aspect including an analysis step of creating an analysis table on the basis of the information obtained in the aggregation step. The method may also include an analysis step (diagnosing step) of analyzing the sensory traits related to visual sensation of the subject on the basis of the information obtained in the aggregation step.

A fourth aspect of the sensory traits information collecting method is that of the second aspect in which, in the information reception step and the collecting step, the sensory traits information is quantified by using a Likert scale in a multiple-choice question method.

A fifth aspect of the sensory traits information collecting method is that of the fourth aspect which uses an SD method, which is a psycho-statistical method for the multiple-choice question method.

A sixth aspect of the sensory traits information collecting method is that of any one of the first to fifth aspects in which the predetermined light is yellow light having a dominant wavelength of 570 to 590 nm.

A seventh aspect of the sensory traits information collecting method is that of any one of the first to sixth aspects in which the predetermined light is magenta light having a complementary dominant wavelength of 500 to 570 nm.

An eighth aspect of the sensory traits information collecting method is that of any one of the first to seventh aspects in which the predetermined light is cyan light having a dominant wavelength of 470 to 530 nm.

A ninth aspect of the sensory traits information collecting method is that of any one of the first to eighth aspects in which the predetermined light is green light having a dominant wavelength of 500 to 570 nm.

A tenth aspect of the sensory traits information collecting method is that of any one of the first to ninth aspects in which the predetermined light has luminance of 0.001 to 5 $cd/m^2$.

An eleventh aspect of the sensory traits information collecting method is that of any one of the first to tenth aspects in which, in the predetermined light environment creating step, the predetermined light is incident on a peripheral visual field region of the retina.

A twelfth aspect of the sensory traits information collecting method is that of any one of the first to eleventh aspects in which the viewed object is a letter, a number, or a symbol, and the predetermined visibility element is any one or more of a counter, an aperture, a joint, an apex, a vertex, and a crotch in the letter, the number, or the symbol.

A thirteenth aspect of the sensory traits information collecting method is that of any one of the first to twelfth aspects in which the viewed object is a letter, a number, or a symbol displayed on a curved surface, and the predetermined visibility element is distortion in the letter, the number, or the symbol.

A fourteenth aspect of the sensory traits information collecting method is that of any one of the first to thirteenth aspects in which the viewed object is a digitally-displayed letter, number, or symbol, and the predetermined visibility element is a missing part in the letter, the number, or the symbol.

A fifteenth aspect of the sensory traits information collecting method is that of any one of the first to fourteenth aspects in which the viewed object is a dot-displayed letter, number or symbol, and the predetermined visibility element is a missing part in the letter, the number, or the symbol.

A sixteenth aspect of the sensory traits information collecting method is that of any one of the first to fifteenth aspects in which the viewed object is a three-dimensional object, and the predetermined visibility element is irregularity on a surface of the three-dimensional object.

A seventeenth aspect of the sensory traits information collecting method is that of any one of the first to sixteenth aspects in which the viewed object is a three-dimensional object, and the predetermined visibility element is a texture on a surface of the three-dimensional object.

An eighteenth aspect of the sensory traits information collecting method is that of any one of the first to seventeenth aspects in which at least one of spectral distribution and luminance of the predetermined light is changed, and then the steps from the predetermined light environment creating step to the collecting step are executed again.

A first aspect of a sensory traits information collecting device according to an embodiment of the present invention has: a first optical portion which creates a white light environment in which white light is incident on a retina of a subject: a second optical portion which creates a predetermined light environment in which predetermined light different from the white light in at least one of spectral distribution and luminance is incident on the retina of the subject: a viewed-object presenting portion which presents one or more viewed objects including a predetermined visibility element to the subject in the white light environment and then presents the viewed object to the subject in the predetermined light environment again: an information receiving portion which receives sensory traits information related to the way of seeing of the viewed object in the white light environment and the predetermined light environment from the subject: and a collecting portion which collects the sensory traits information received by the information receiving portion.

A second aspect of the sensory traits information collecting device is that of the first aspect further including an aggregation/analysis portion which executes various types of arithmetic processing on the basis of the collected information obtained from the collecting portion.

A third aspect of the sensory traits information collecting device is that of the second aspect further including an output portion which outputs a result of the various types of arithmetic processing.

A fourth aspect of the sensory traits information collecting device is that of any one of the first to third aspects in which the viewed-object presenting portion is a display.

A fifth aspect of the sensory traits information collecting device is that of any one of the first to fourth aspects in which the second optical portion is glasses, goggles, a light, or a lighting device.

A sixth aspect of the sensory traits information collecting device is that of any one of the first to fifth aspects in which the second optical portion is a display.

A seventh aspect of the sensory traits information collecting device is that of any one of the first to sixth aspects in which the first optical portion is a light or a lighting device.

An eighth aspect of the sensory traits information collecting device is that of any one of the first to seventh aspects in which the first optical portion is a display.

Advantageous Effects of Invention

The sensory traits information collecting method and the sensory traits information collecting device of the present invention can collect the sensory traits information on the sense of sight of the subject without relying on a person having specialized knowledge or the like and with excluding subjectivity of the subject as much as possible. Furthermore, the sensory traits information on the sense of sight of the subject can be aggregated and analyzed.

BRIEF DESCRIPTION OF DRAWINGS

FIG. 12 is a diagram illustrating an answer form Q.

DESCRIPTION OF EMBODIMENTS

A sensory traits information collecting method and a sensory traits information collecting device according to an embodiment of the present invention will be explained with reference to the drawings.

The sensory traits information collecting method and the sensory traits information collecting device 1 create an environment in which the "way of seeing" is easily changed for a person having a biased visual cognitive function (photosensitivity) and present a viewed object for which the person easily perceives the change in the "way of seeing" after an adaptation time has elapsed. Then, the "sensory traits information of the sense of sight" related to a mode/degree of the change in the "way of seeing" is collected from the subject.

Sensory Traits Information Collecting Device 1

Figure 1:
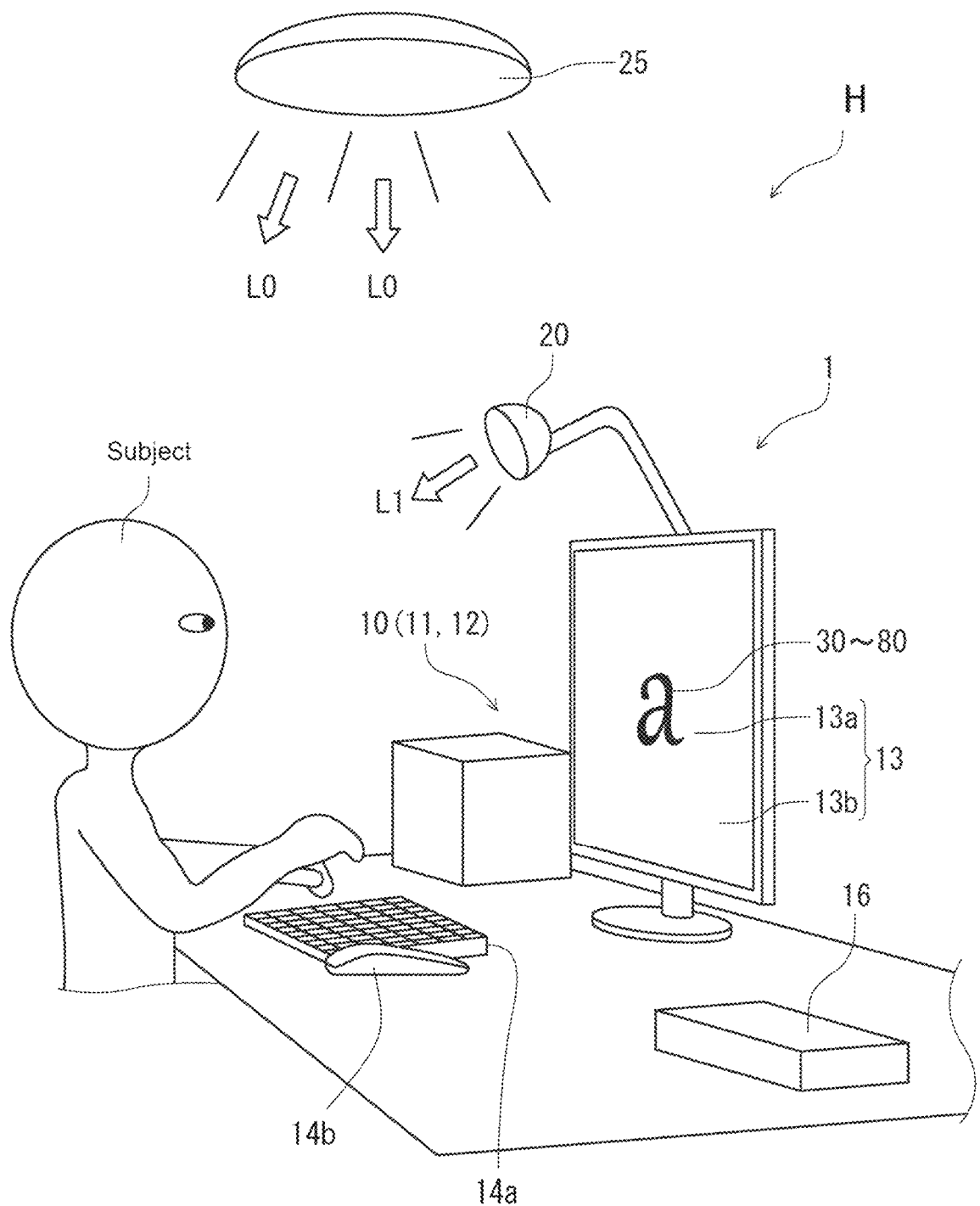
FIG. 1 is a diagram illustrating a sensory traits information collecting device 1 according to an embodiment.

FIG. 1 is a diagram illustrating a sensory traits information collecting device 1 according to an embodiment.

Figure 2:
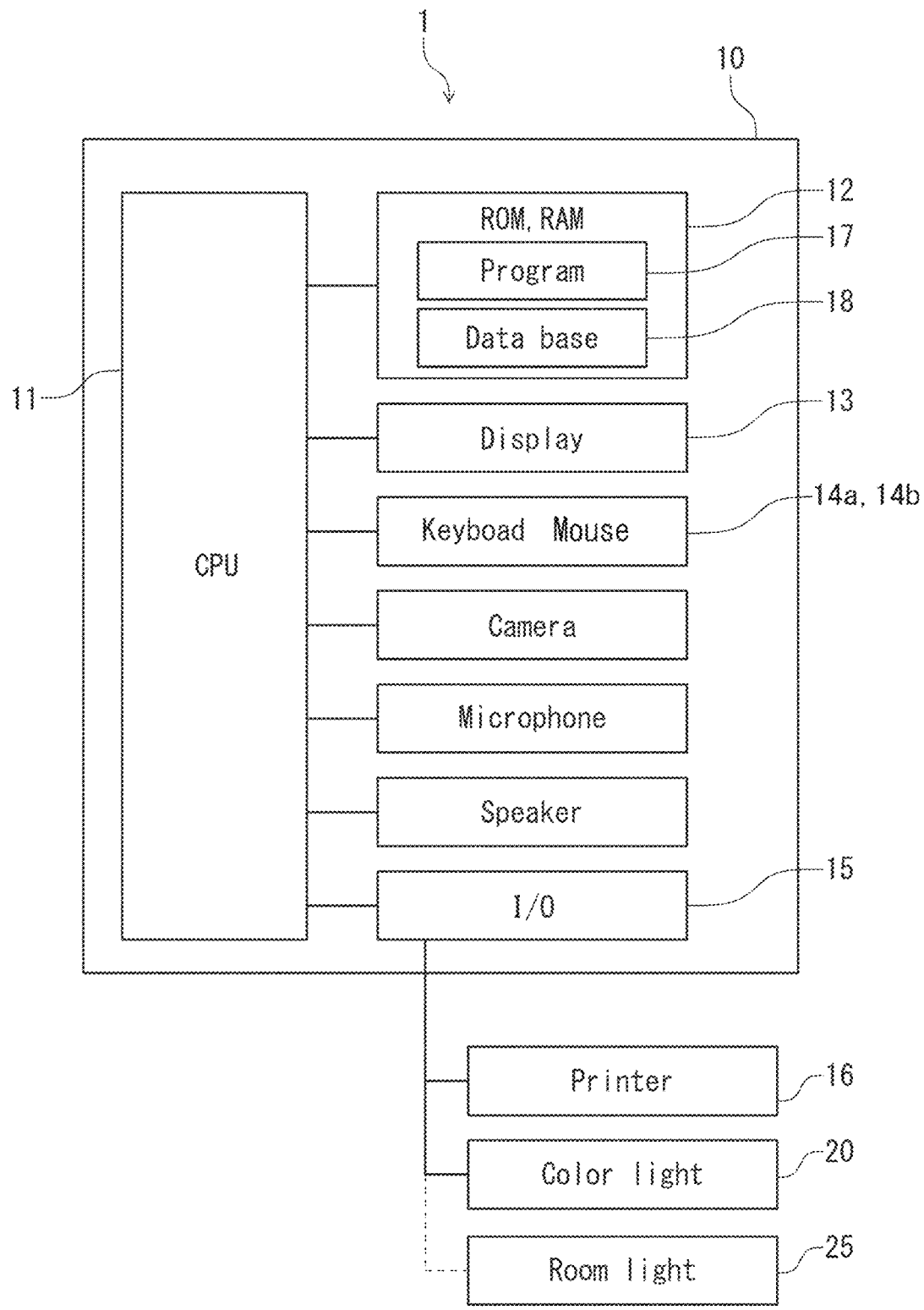
FIG. 2 is a system block diagram illustrating a schematic configuration of the sensory traits information collecting device 1.

FIG. 2 is a system block diagram illustrating a schematic configuration of the sensory traits information collecting device 1.

The sensory traits information collecting device 1 includes a personal computer 10, a color light 20, and an indoor lighting device 25.

The personal computer 10 includes an arithmetic processing unit 11, a storage unit 12, a display 13, a keyboard 14*a*, an I/O 15 and the like.

The arithmetic processing unit (a collecting portion and an aggregation/analysis portion) 11 is a CPU or the like and executes various types of processing in the personal computer 10. The arithmetic processing unit 11 leads a sensory traits information collecting method, which will be described below.

The storage unit 12 is a ROM, a RAM, an HDD, an SSD or the like where various programs and data bases are stored. Specifically, a sensory traits information collecting program 17 and a viewed-object data base 18 are stored in the storage unit 12.

The display (a viewed object presenting portion and an output portion (as well as a first optical portion and a second optical portion)) 13 displays characters, images and the like in response to commands from the arithmetic processing unit 11. The display 13 displays (presents) a viewed object 30 and the like, which will be described below, to the subject (a person having biases in visual cognitive function).

Moreover, the display 13 also displays an answer form Q of the sensory traits information reception and collecting step S5 and a result (aggregated information, analysis information) of the aggregation/analysis step S6, which will be described below.

The display 13 has a plurality of pixels, and the pixel density is preferably 150 ppi or higher, especially 200 ppi or higher is preferable.

In the display 13, luminance (illuminance), a color of light emission (wavelength) and the like are controlled in accordance with commands from the arithmetic processing unit 11. The display 13 emits visible light (glows) with luminance of 0.001 to 1000000 cd/m$^2$. In particular, it is possible to switch between light emission with luminance of 5 cd/m$^2$ or more and light emission with luminance less than 5 cd/m$^2$.

The keyboard (an information receiving portion) 14*a* is an operation input portion for inputting information such as characters and numerical values to the personal computer 10. In addition to or instead of the keyboard 14*a*, a mouse (an information receiving portion) 14*b*, a pointing device, a touch panel (the display 13) or the like may be used.

The I/O 15 is an interface for inputting/outputting information with respect to an external device connected to the personal computer 10. The color light 20 and the indoor lighting device 25 are connected to the I/O 15. A printer 16 or the like may be connected to the I/O 15.

The personal computer 10 also includes a camera, a microphone, a speaker and the like.

Color Light 20

The color light (the second optical portion (and the first optical portion)) 20 is a lighting fixture that illuminates predetermined light L1. The color light 20 is the lighting fixture having a lamp such as an electric bulb, a fluorescent lamp, an LED and an OLED and is a desk light, a handy light or the like, for example.

The color light 20 is controlled in terms of turning on/off, luminance (illuminance), color (wavelength) of illumination light, an irradiation direction and the like according to commands from the arithmetic processing unit 11 of the personal computer 10.

The color light 20 illuminates visible light with luminance of 0.001 to 1000000 cd/m$^2$. In particular, it is possible to switch between light emission with luminance of 5 cd/m$^2$ or more and light emission with luminance less than 5 cd/m$^2$.

The color light 20 illuminates the predetermined light L1 toward the face of the subject who gazes at the display 13 in front of the personal computer 10. When the subject gazes at an image (e.g., the viewed object 30 and the like) displayed on the display 13, the predetermined light L1 enters the retina R of the subject.

An environment in which the predetermined light L1 is incident on the retina R of the subject is referred to as a predetermined light environment. The color light 20 functions as a light source in a predetermined light environment creating step S3, which will be described later. In the predetermined light environment, the subject can gaze at the image (e.g., the viewed object 30 and the like) displayed on the display 13 without any trouble.

The color light 20 should be positioned away from the display 13. This is to cause the predetermined light L1 to enter a peripheral visual field region R2 of the retina R. When the subject gazes at the image (e.g., the viewed object 30 and the like) displayed on the display 13, it is preferable that the predetermined light L1 does not interfere with the gazing. For example, it is configured such that the light of the image (e.g., the viewed object 30 and the like) displayed on the display 13 is incident on a central visual field region R1 of the retina R, and the predetermined light L1 is incident on the peripheral visual field region R2 of the retina R.

Indoor Lighting Device 25

The indoor lighting device (the first optical portion, (the second optical portion)) 25 is a ceiling light arranged on a ceiling of a room (room H) in which the personal computer 10 is placed. The personal computer 10 is placed in the room H in which natural light (sunlight) is blocked, and the entire area of the room H is irradiated with white light L0 by turning on the indoor lighting device 25.

The indoor lighting device 25 is controlled in terms of turning on/off, luminance (illuminance) and the like in response to the commands from the arithmetic processing unit 11 of the personal computer 10. The connection between the indoor light 25 and the personal computer 10 is not limited to a wired connection but can also be a wireless connection.

The indoor lighting device 25 emits the white light L0 with luminance of 0.001 to 1000000 cd/m². In particular, it can switch between light emission with luminance of 5 cd/m² or more and light emission with a luminance of less than 5 cd/m².

When the subject gazes at the image (e.g., the viewed object 30 and the like) displayed on the display 13, the white light L0 is incident on the retina R (the central visual field region R1 and the peripheral visual field region R2) of the subject.

An environment in which the white light L0 is incident on the retina R of the subject is referred to as a white light environment. The indoor lighting device 25 functions as a light source for the white light environment creating step S1. In the white light environment, the subject can gaze at the image (e.g., the viewed object 30 and the like) displayed on the display 13 without any trouble.

The arithmetic processing unit 11 executes a program stored in the storage unit 12, reads various types of data stored in the storage unit 12 as necessary, and causes the personal computer 10 to operate.

Specifically, the arithmetic processing unit 11 executes the sensory traits information collecting program 17, reads the data of the viewed object 30 and the like from the viewed-object data base 18, and displays the viewed object 30 and the like on the display 13. At this time, the arithmetic processing unit 11 turns on/off the indoor lighting device 25 and the color light 20 so that the white light L0 or the predetermined light L1 are incident on the retina R of the subject.

In order to receive an answer from the subject, the arithmetic processing unit 11 displays an answer form Q regarding a change in the way of seeing of the viewed object 30 and the like on the display 13. Then, the arithmetic processing unit 11 stores (collects) information input from the keyboard 14a or the like (raw data of sensory traits information on the sense of sight (collected information)) on the storage unit 12. Moreover, the arithmetic processing unit 11 executes various types of arithmetic processing (aggregation/analysis) for this collected information and displays and outputs the results (aggregated information and analysis information of the sensory traits information on the sense of sight) of the processing on the display 13 and the printer 16.

Photoreceptor Cell

Figure 3A:
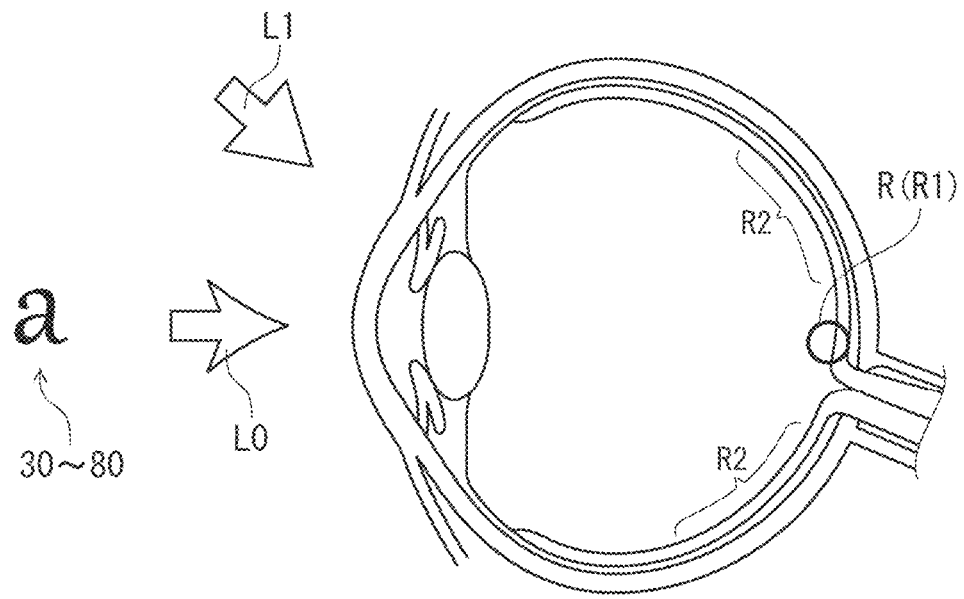
FIG. 3(*a*) is a vertical sectional view illustrating a structure of a human eye, and FIG. 3(*b*) is a schematic view illustrating a human photoreceptor cell.
Figure 3B:
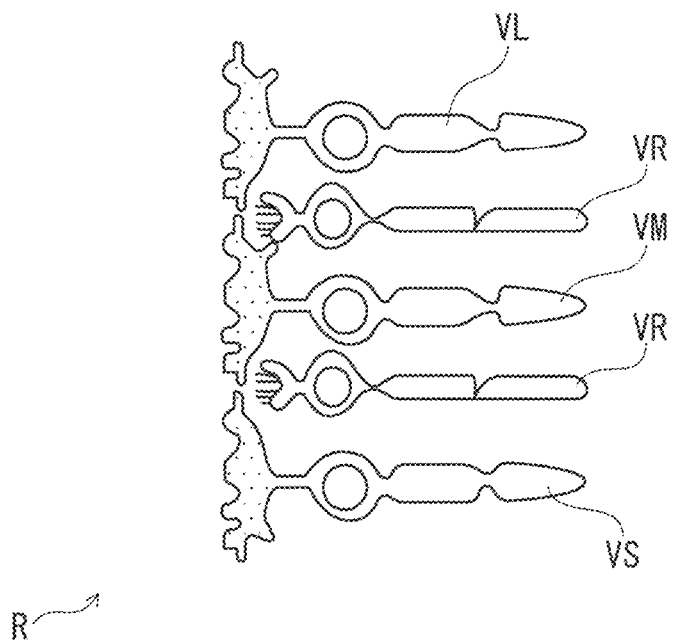

FIG. 3(a) is a vertical sectional view illustrating a structure of a human eye. FIG. 3(b) is a schematic view illustrating a human photoreceptor cell.

Figure 4:
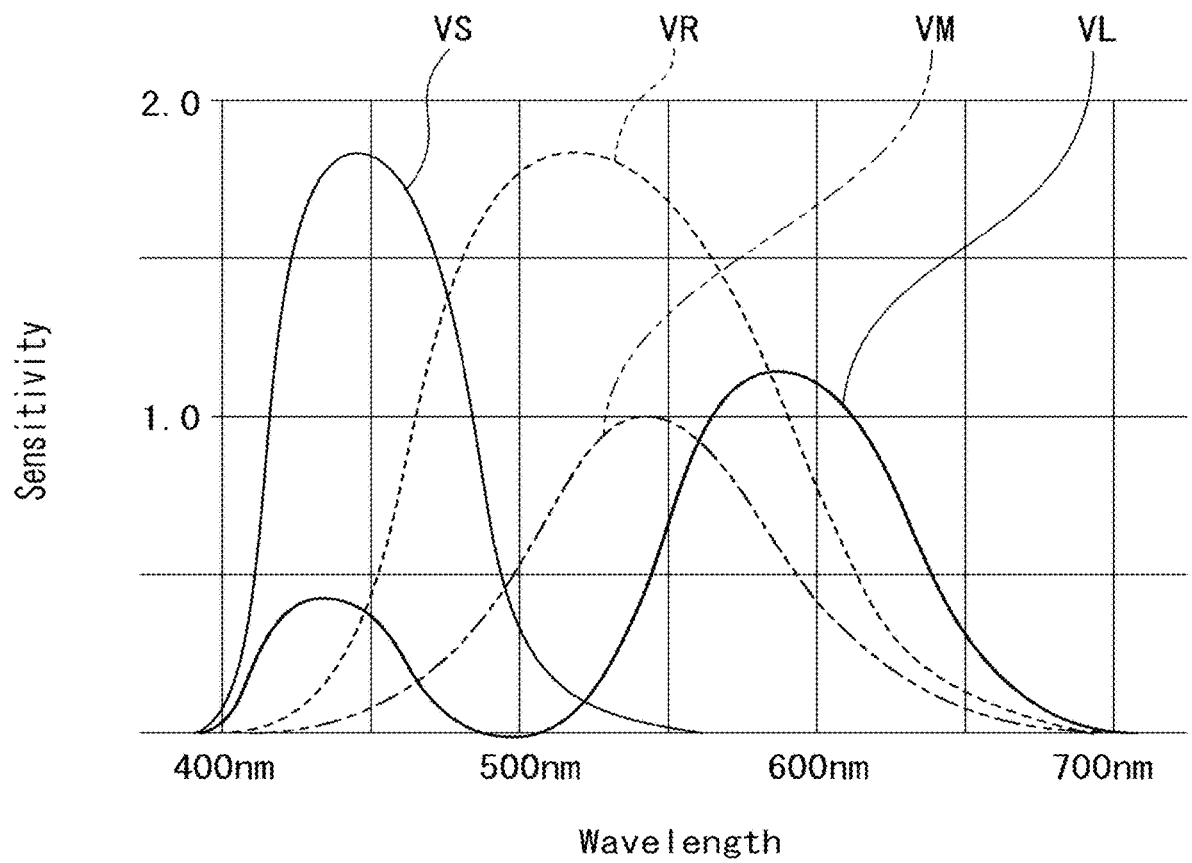
FIG. 4 is a spectral sensitivity curve of a human photoreceptor cell.

FIG. 4 is a spectral sensitivity curve of a human photoreceptor cell.

Figure 5:
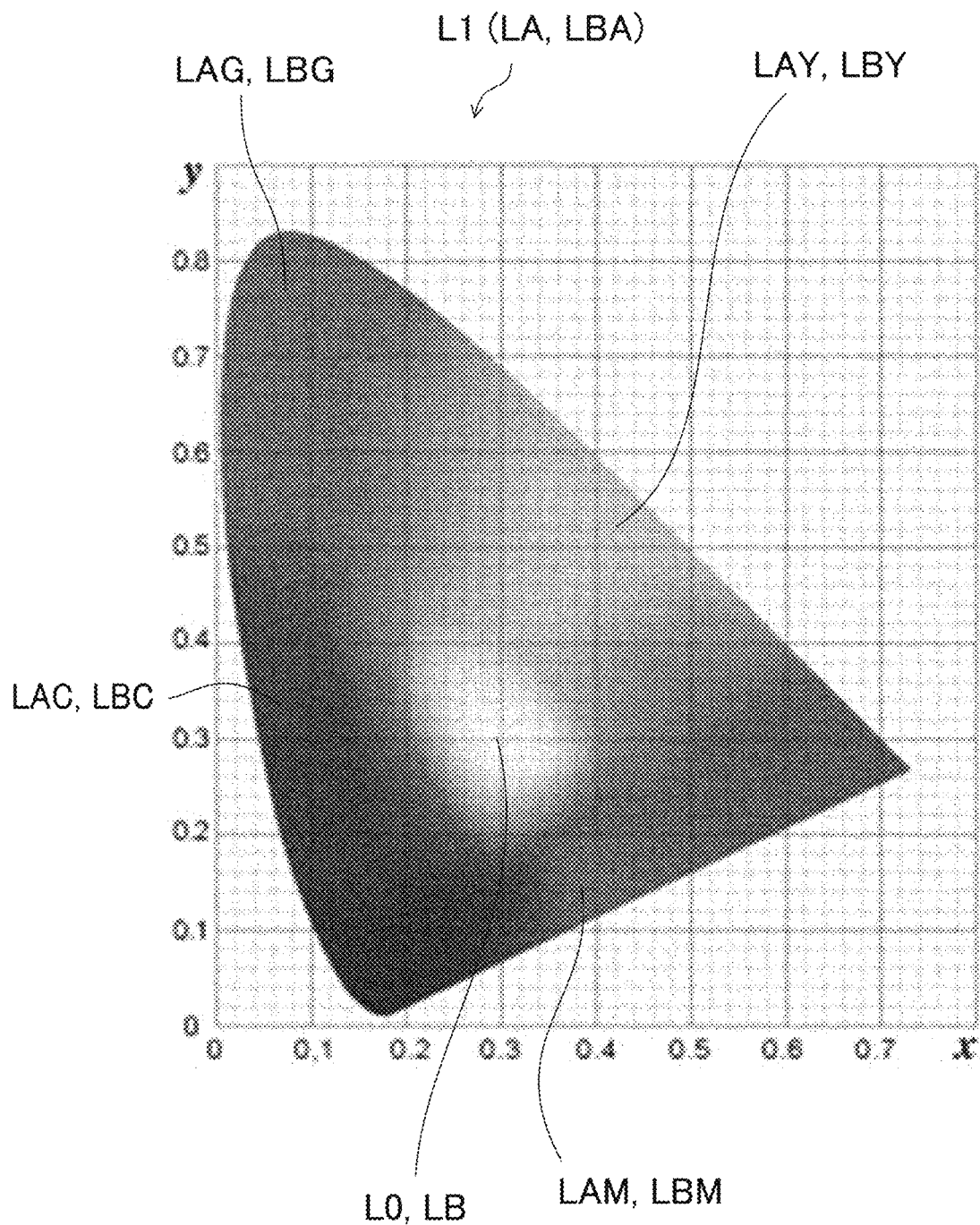
FIG. 5 is XY chromaticity diagram of a color space.

FIG. 5 is XY chromaticity diagram of a color space defined by International Commission on Illumination (CIE 1931).

The photoreceptor cells in the human retina R include cone cells and rod cells. The cone cells are cone-shaped photoreceptor cells that are located near the central fovea of the retina R and detect color. The cone cells function in a bright place. The rod cells are rod-shaped photoreceptor cells that are located in the periphery of the central fovea and detect light. The rod cells function primarily in a dark place.

The visual function in a situation where the cone cells work (i.e., a situation in which a sufficient amount of light intensity) is called photopic vision. The photopic vision occurs under a light amount of the luminance 5 to 1000000 cd/m² (illuminance of 10 to 100000 lx).

The visual function in a situation where the rod cells work (i.e., a situation in which a light intensity is low) is called scotopic vision. The scotopic vision occurs under a light amount of the luminance 0.01 to 0.000001 cd/m² (illuminance of 0.001 to 0.01 lx).

The visual function in a situation where both the cone cells and the rod cells work (i.e., a situation in which the light amount is small but not completely darkness) is called mesopic vision. The mesopic vision is the combination of the photopic vision and the scotopic vision. The mesopic vision occurs under a light amount of the luminance 0.001 to 5 cd/m² (illuminance of 0.01 to 10 lx). The mesopic vision is defined as the visual function with luminance 0.005 to 5 cd/m² by the International Commission on Illumination (CIE) or as the visual function with luminance 0.001 to 3 cd/m² by the Illuminating Engineering Society (IES).

The cone cells are classified into three types corresponding to the three primary colors of light. Specifically, the cone cells include: long cone cells that react to light in a long wavelength range (around yellow); middle cone cells that react to light in a middle wavelength range (around yellow green); and short cone cells that react to light in a middle wavelength range (around blue).

The long cone cells are also referred to as red cone cells. The middle cone cells are also referred to as green cone cells. The short cone cells are also referred to as blue cone cells.

A specific color is sensed (perceived) according to a combination of intensities of stimulus received by each of the three types of cone cells (a relative ratio of excitation of the three types of cone cells).

Hereinafter, the long cone cells, the middle cone cells, the short cone cells, and the rod cells are also referred to as L photoreceptor cells VL, M photoreceptor cells VM, S photoreceptor cells VS, and R photoreceptor cells VR, respectively.

Visible Light

The visible light is light having a wavelength of 380 to 780 nm. A relationship (spectroscopic spectrum) between the wavelength and the color of visible light is substantially as follows. Wavelength 380 to 430 nm: blue-violet, 430 to 460 nm: blue, 460 to 500 nm: blue-green, 500 to 570 nm: green, 570 to 590 nm: yellow, 590 to 610 nm: orange, 610 to 780 nm: red The sensitivity of a photoreceptor cell to visible light has wavelength dependency. Specifically, an absorption maximum wavelength of the L photoreceptor cell VL is around 558 nm, the absorption maximum wavelength of the M photoreceptor cell VM is around 531 nm, the absorption maximum wavelength of the S photoreceptor cell VS is around 419 nm, and the absorption maximum wavelength of the R photoreceptor cell VR is around 500 nm.

A peak wavelength at which the light-emission intensity of the visible light becomes maximum is different from the wavelength which is actually perceived by the eye. The wavelength of the color perceived by the eye is called the main wavelength or a dominant wavelength.

The light perceived as blue-violet has the dominant wavelength of around 400 nm (380 nm to 430 nm).

The light perceived as blue has the dominant wavelength of around 450 nm (430 nm to 470 nm).

The light perceived as cyan has the dominant wavelength of around 490 nm (470 nm to 530 nm).

The light perceived as green has the dominant wavelength of around 550 nm (530 nm to 570 nm).

The light perceived as yellow has near the dominant wavelength of around 580 nm (570 nm to 590 nm).

The light perceived as red has the dominant wavelength of around 610 nm (590 nm to 780 nm).

The light perceived as magenta has a complementary dominant wavelength of around 550 nm (530 nm to 570 nm).

White Light L0

The white light L0 is light in which light (colors) of all the wavelengths of the visible light are mixed almost equally, and which does not give any sense of color. The white light L0 may also be defined as a color of average daylight.

The white light L0 is light with luminance of 5 to 1000000 cd/m$^2$ and realizes the photopic vision by being incident on the retina R of the subject. The white light L0 is light in which all of the three types of cone cells (S photoreceptor cells VS, M photoreceptor cells VM, and L photoreceptor cells VL) present in the retina R react (are excited).

Predetermined Light L1

The predetermined light L1 is visible light which is different from the white light L0 in at least one of spectral distribution and luminance. The predetermined light L1 includes light LA having a spectral distribution different from that of the white light L0, light LB with luminance different from that of the white light L0, and light LBA having different spectral distribution and luminance from those of the white light L0.

Different spectral distribution means that the predetermined light L1 (the light LA and the light LBA) is colored light. Different luminance means that the predetermined light L1 (the light LB and the light LBA) is light with luminance 0.001 to 5 cd/m$^2$.

The light LA is light (colored light) with the luminance 5 to 1000000 cd/m$^2$, with light (color) of a part of the wavelength of the visible light.

The light LA is light which one or two of the three types of cone cells mainly react to. The light LA is any one of: yellow light LAY with the dominant wavelength of 570 nm to 590 nm: magenta light LAM with the complementary dominant wavelength of 500 nm to 570 nm; cyan light LAC with the dominant wavelength of 470 nm to 530 nm; and green light LAG with the dominant wavelength of 500 nm to 570 nm.

The yellow light LAY is visible light which excites the L photoreceptor cell VL and the M photoreceptor cell VM and suppresses (sedates) the S photoreceptor cell VS.

The yellow light LAY includes, in addition to the light having a peak wavelength of near 580 nm, light having a bottom wavelength of near 450 nm (complementary color of blue), and light having peak wavelengths of near 550 nm and near 610 nm (color mixture of green and red).

The yellow light LAY, when incident on the retina R, excites the L photoreceptor cell VL and the M photoreceptor cell VM and suppresses the S photoreceptor cell VS.

The magenta light LAM is visible light which excites the L photoreceptor cell VL and the S photoreceptor cell VS and suppresses the M photoreceptor cell VM.

The magenta light LAM includes, in addition to light having a bottom wavelength of near 550 nm (complementary color of green), light having peak wavelengths of near 450 nm and near 610 nm (color mixture of blue and red).

The cyan light LAC is visible light which excites the M photoreceptor cell VM and the S photoreceptor cell VS and suppresses the L photoreceptor cell VL.

The cyan light LAC includes, in addition to light having a peak wavelength of near 490 nm, light having a bottom wavelength of near 610 nm (complementary color of red) and light having peak wavelengths of near 450 nm and near 550 nm (color mixture of blue and green).

The green light LAG is visible light which excites the M photoreceptor cell VM and suppresses the L photoreceptor cell VL and the S photoreceptor cell VS. That is, the color light 20 causes the green light LAG (having the dominant wavelength of near 550 nm) to be incident on the retina R.

The green light LAG includes, in addition to light having a peak wavelength of near 550 nm, light having bottom wavelengths of near 450 nm and near 610 nm (color mixture of yellow and cyan).

The light LB is light (gray light) with luminance of 0.001 to 5 cd/m$^2$ in which light (colors) of all the wavelengths of the visible light is mixed almost equally. The gray light LB is light obtained by lowering the luminance of the white light L0 and is light in which color tones are difficult to perceive.

The gray light LB realizes the mesopic vision by entering the retina R of the subject. That is, the gray light LB is light to which the rod cells present in the retina R begin to react.

The rod cells are highly sensitive to light and darkness, which correspond to the intensity of light. The rod cells are not involved in color sensing. When the light with luminance of 5 cd/m$^2$ or less enters the retina R, it excites the rod cells and makes them sense the light and darkness The gray light LB excites both the cone cells (the L photoreceptor cells VL, the M photoreceptor cells VM, and the S photoreceptor cells VS) and the rod cells (the R photoreceptor cells VR) (mesopic vision).

The light LBA is light (gray colored light) with luminance of 0.001 to 5 cd/m$^2$ which includes light (color) of a part of the wavelength of the visible light. The light LBA includes gray-yellow light LBY, gray-magenta light LBM, gray-cyan light LBC, and gray-green light LBG.

The yellow light LBY is light obtained by lowering luminance of the yellow light LAY. The magenta light LBM is light obtained by lowering luminance of the magenta light LAM. The cyan light LBC is light obtained by lowering luminance of the cyan light LAC. The green light LBG is light obtained by lowering luminance of the green light LAG.

[Viewed object 30 to 80]

Figure 6:
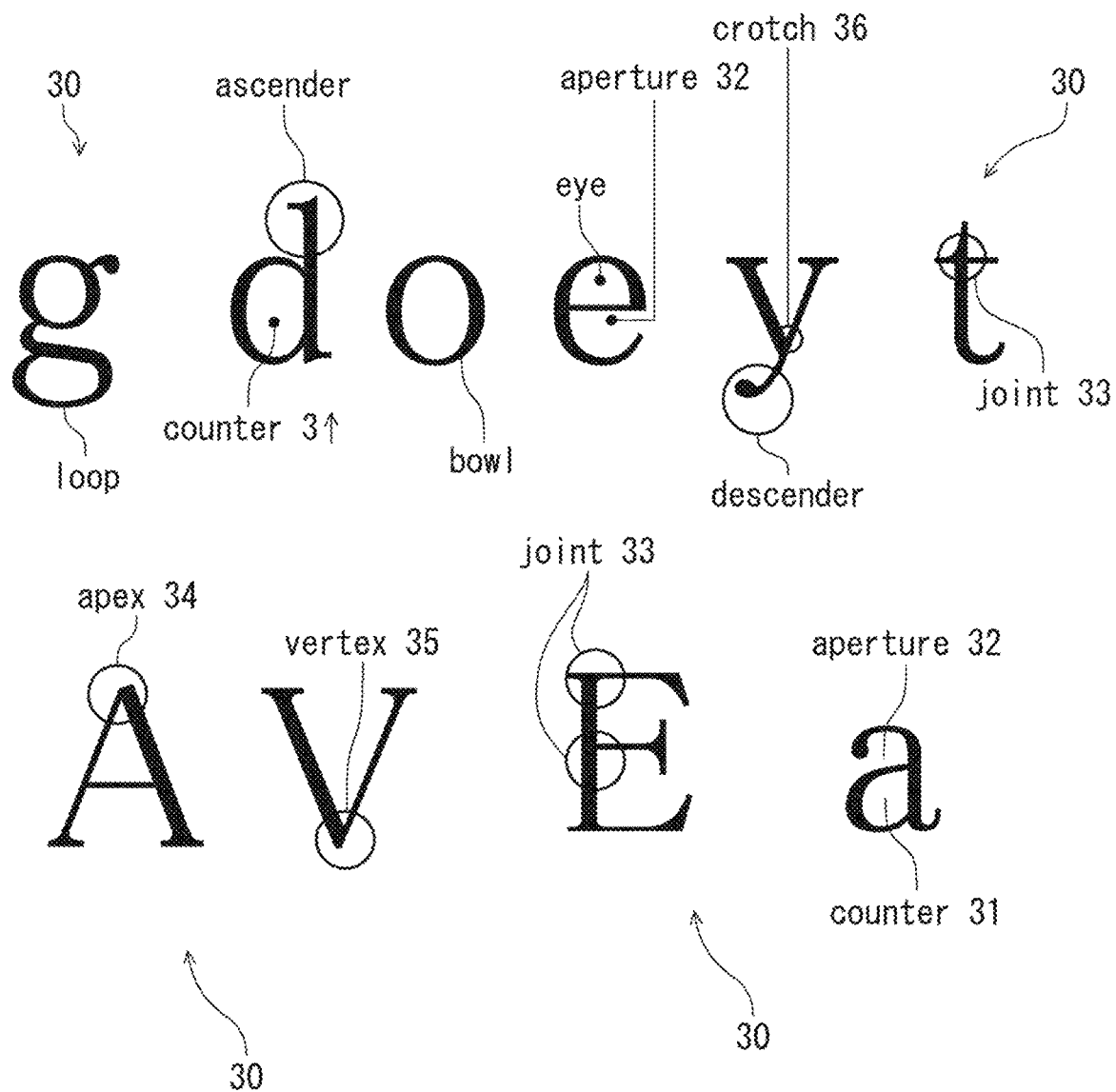
FIG. 6 is a diagram illustrating viewed objects 30 including predetermined visibility elements.

FIG. 6 is a diagram illustrating viewed objects 30 including predetermined visibility elements 31 and the like.

Figure 7:
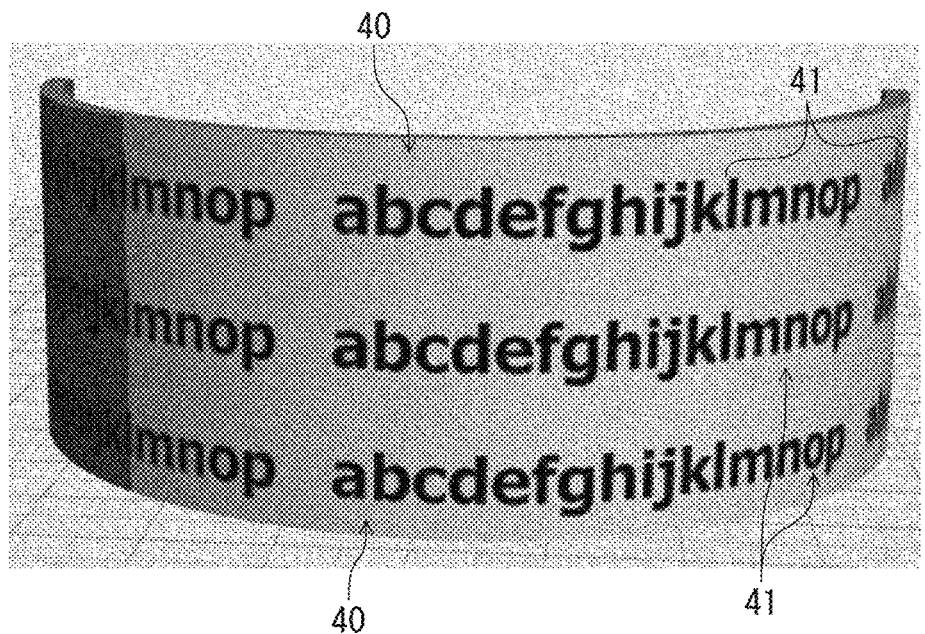
FIG. 7 is a diagram illustrating viewed objects 40 including predetermined visibility elements.

FIG. 7 is a diagram illustrating viewed objects 40 including predetermined visibility elements 41.

Figure 8:
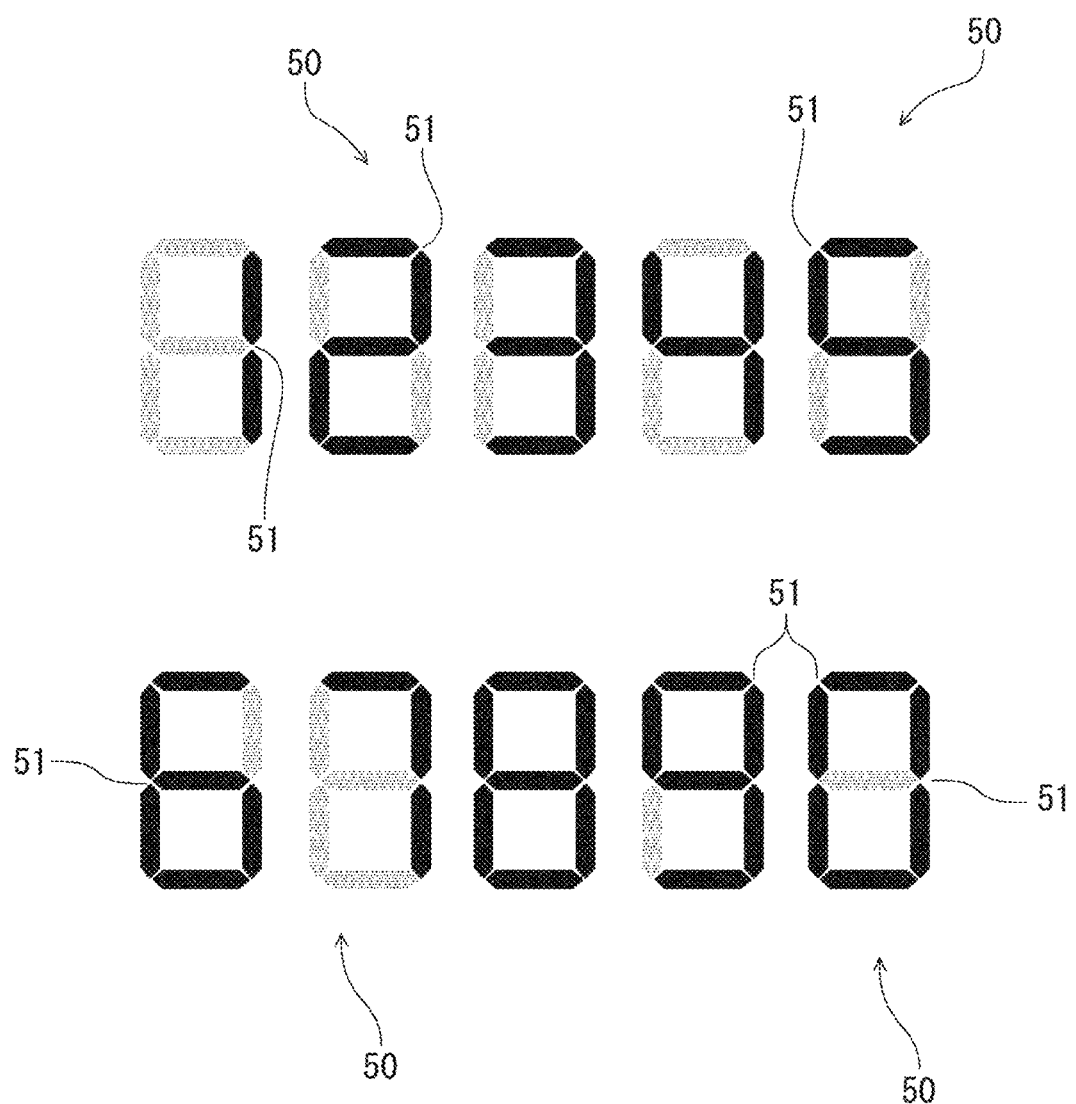
FIG. 8 is a diagram illustrating viewed objects 50 including predetermined visibility elements.

FIG. 8 is a diagram illustrating viewed objects 50 including predetermined visibility elements 51.

Figure 9:
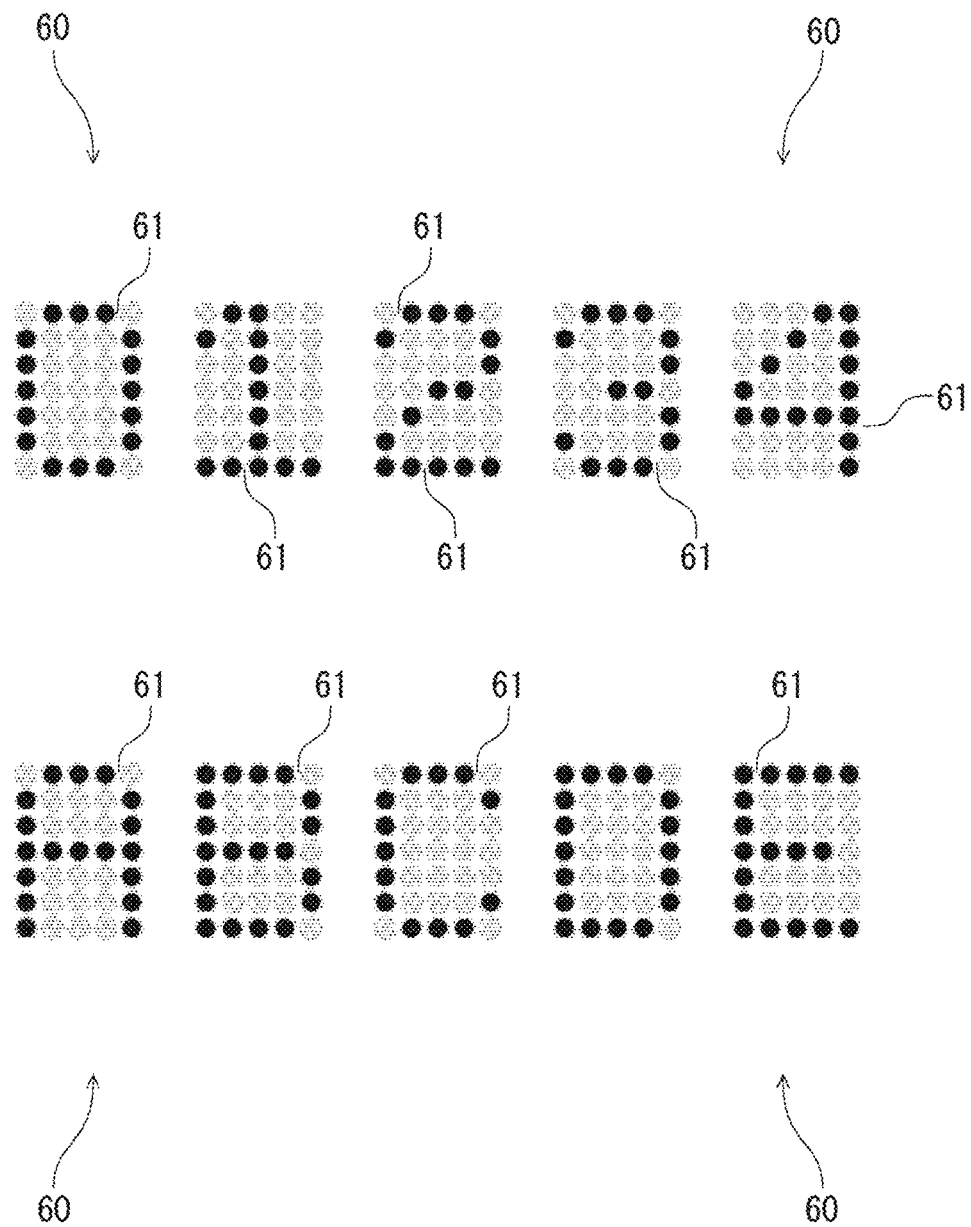
FIG. 9 is a diagram illustrating viewed objects 60 including predetermined visibility elements.

FIG. 9 is a diagram illustrating viewed objects 60 including predetermined visibility elements 61.

Figure 10A:
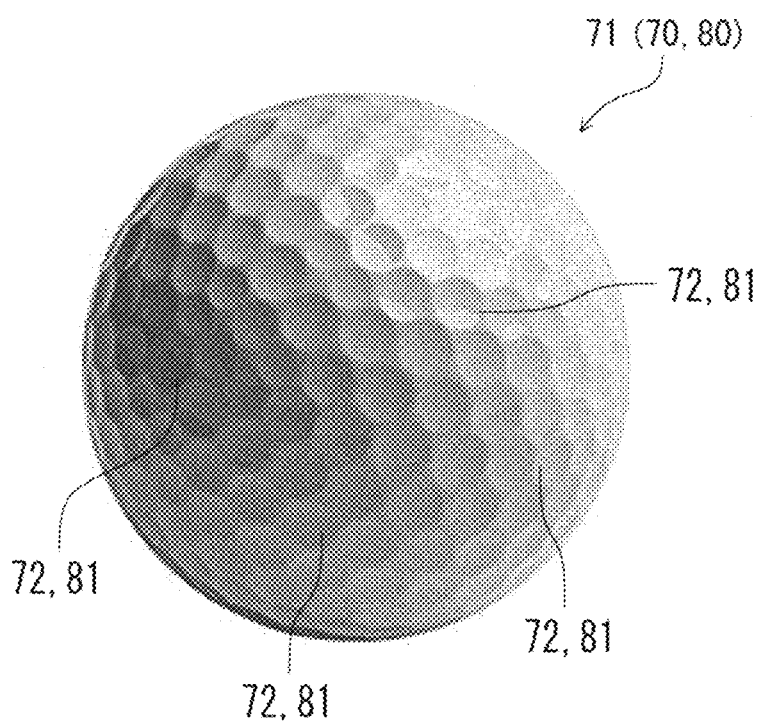
FIGS. 10(*a*) and 10(*b*) are diagram illustrating viewed objects 70 and 80 including predetermined visibility elements.
Figure 10B:
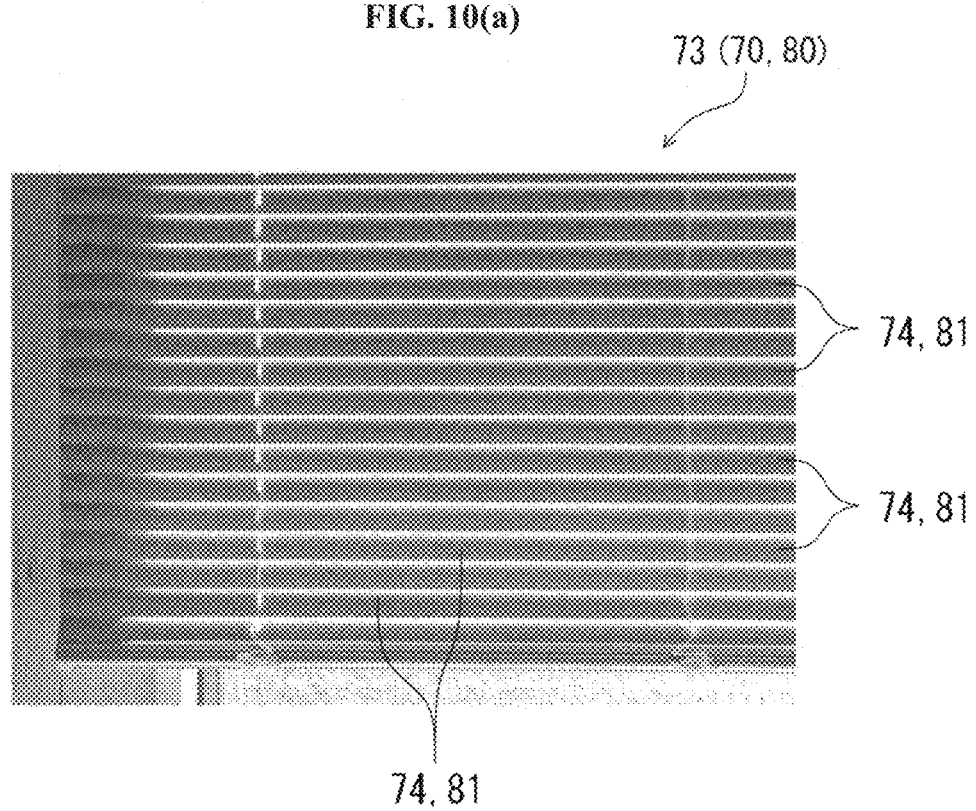

FIGS. 10(*a*) and 10(*b*) are diagrams illustrating viewed objects 70 and 80 including predetermined visibility elements 72 and 74, in which FIG. 10(*a*) shows a golf ball 71, and FIG. 10(*b*) shows a blind curtain 73.

In the viewed-object data base 18, image data of a plurality of viewed objects 30 to 80 are stored. These viewed objects 30 to 80 are individually displayed on the display 13.

The viewed objects 30 to 80 are targets to be gazed by the subject. In particular, the viewed objects 30 and the like are targets including a predetermined visibility element 31 and the like.

The viewed objects 30 to 80 may be either flat or three-dimensional objects, and stationary objects (still images) are preferable.

The predetermined visibility element is an element that tends to be difficult to visually recognize or difficult to visually recognize (hereafter, low visibility element) which those with a biased visual cognitive function have. In other words, this is element that makes reading and writing of characters on the viewed objects 30 and the like and visuospatial perception difficult or poor for those with a biased visual cognitive function. Therefore, the low visibility elements can also be considered to be a visibility-obstructing element or a difficult-to-see element.

The viewed object 30 is an alphabetic letter, a Roman numeral, or a symbol. The predetermined visibility element is an element in these letters or numbers. Specifically, the predetermined visibility element may be a counter 31, an aperture 32, a joint 33, an apex 34, a vertex 35, a crotch 36, or the like. Further, the predetermined visibility element may also be a bowl, a loop, a tie, a descender, an ascender, or the like.

The counter 31 indicates a closed space included within a letter. The "d", "p" and the like have the counters 31. Those that are not completely closed are also included in the counter 31. A space that is not completely closed in the letters such as "c" or "n", etc. may be referred to as an aperture 32 or an open counter. Each of the letters "a" and "e" has the counter 31 and the aperture 32. The closed space of "e" may be referred to as an "eye".

As illustrated in FIG. 6, a person having a bias in visual cognitive function tends to be poor at visual recognition (visual perception) of characters with the counter 31 or the aperture 32 such as "a" and "e". A person having a biased visual cognitive function may not be able to correctly recognize the counter 31 and the aperture 32 or may have difficulty distinguishing between them.

A person having a biased visual cognitive function may have difficulty in or poor at visual recognition of a part in which two lines connect to each other, such as a joint 33, an apex 34, a vertex 35, and a crotch 36.

Moreover, a person having a biased visual cognitive function may have difficulty in or is poor at distinguishing the presence or the absence or distinction of a bowl, a loop, a tail, a descender, and an ascender.

The viewed object 40 are alphabetic letters, a Roman numeral, or a symbol displayed on a curved surface (curved character). The predetermined visibility element is a distortion 41. That is, it is a character or the like whose height and width are different or changed.

As shown in FIG. 7, characters printed or displayed on a curved surface appear to have different character widths. The sentences at both ends in a horizontal direction are crushed (shrink) in the horizontal direction and appear to have a smaller character width.

A person having a biased visual cognitive function tends to have difficulty in viewing characters or the like in which characters' height or characters' width are different or changed (distortion 41).

The viewed objects 50 are digitally-displayed alphabetic letters, Roman numerals or symbols (7 segments). The predetermined visibility elements are the missing parts 51 of these letters or the numerals.

As shown in FIG. 8, a digitally-displayed alphabetic character or Roman numeral has a missing part 61 which does not exist in the original character or numeral.

When a person having a biased visual cognitive function views the digitally-displayed alphabetic letter or the like, the person tends to perceive them as a mere pattern (a plurality of lines) instead of recognizing them as letters, etc. For example, as illustrated in FIG. 8, a digital display of "1" may be visually recognized as two vertical bars and have difficulty or poor at recognizing it as a number.

The viewed object 60 is a dot-displayed alphabetic letters, Roman numeral or symbol (dot character). The predetermined visibility elements are these missing parts 61 of the letters or the numerals.

As shown in FIG. 9, a dot-displayed alphabetic letters or Roman numeral has the missing part 61 which does not exist in the original letters or numeral.

When a person having a biased visual cognitive function views the dot-displayed alphabet letters or the like, the person cannot recognize them as letters, etc., so that the person tends to perceive them as a mere pattern (multiple dots). For example, as shown in FIG. 9, a dot display of "0" may be visually recognized as a group of 14 black circles, and as a result, they might have difficulty or poor at recognizing it as number.

The viewed object 70 is a three-dimensional object (including a 3D texture). The predetermined visibility element is an irregularity 72 or a shadow 74 formed on the surface of the three-dimensional object. The irregularity 72 is, for example, a fine structure (surface property) such as a dimple or an emboss. The shadow 74 is a change in reflection of light (surface property) accompanying irregularity or inclination of the surface of the three-dimensional object.

A person having a biased visual cognition function tends to be poor at visually recognizing the small irregularity 72 or the shadow 74 present on the surface of the three-dimensional object. It is considered for a person having a biased visual cognition function to be difficult to distinguish and to recognize the irregularity 72 or the shadow 74 (the nature of the reflected light).

As shown in FIG. 10(*a*), when a person having a biased visual cognition function views dimples (irregularity 72) on a golf ball 71, the person tends to have difficulty in or be poor at obtaining a three-dimensional effect from the shadow of the dimples, and to visually recognize the dimples as a planar pattern. Alternatively, it may be difficult or hard to distinguish between a recess and a projection.

As shown in FIG. 10(*b*), when a person having a biased visual cognition function views slats of a blind curtain 73, the person may have difficulty in or be poor at determining the direction and angle of the slats from the shadow 74. That is, the person tends to have difficulty in or be poor at obtaining a three-dimensional effect from the shadow 74 of the slats in the blind curtain 73, and to visually recognize the shadow 74 as a planar pattern.

The viewed object 70 is not limited to the golf ball 71 or the blind curtain 73. For example, it may be a plurality of tiles laid on a plane. A person having a biased visual cognition function tends to be poor at visually recognizing joints (irregularity 72) between the tiles.

The viewed object 80 is a three-dimensional object (including a 3D texture) (see FIGS. 10(*a*) and 10(*b*)). The predetermined visibility element is a texture 81 of the three-dimensional object. The texture 81 is caused by the surface properties (surface characteristics) of the three-dimensional object. This surface property is based on the reflection characteristics (reflectance) and transmission characteristics (transmittance) of the surface of the three-dimensional object. In other words, a person visually perceives the texture 81 of the three-dimensional object based on the properties (gloss, transparency, shadow, density, and the like) of light reflected on or transmitted through the surface of the three-dimensional object.

A person having a biased visual cognition function tends to have difficulty visually recognizing the surface texture 81 on the three-dimensional object. It is thought that a person having a biased visual cognition function have difficulty distinguishing and recognizing shadows or the like based on the texture 81 (reflection characteristics and transmission characteristics).

The viewed object 80 is a natural scenery (clouds, plants, or the like), a building, an interior decoration, or an interior part (curtains, stairs, or t the like). The viewed object 80 may also be the golf ball 71 or the blind curtain 73.

When a person having a biased visual cognition function views architectural objects, trees, plants, clouds, and the like, the person has difficulty or is poor at obtaining a three-dimensional impression from the texture 81 of the surface (gloss, transparency, shadow, density and the like) thereof, and tend to perceive them as a planar pattern or the like.

These viewed objects 30 to 80 are displayed on display 13 or the like by optionally adjusting the color, light-darkness (brightness contrast), size, posture (angle), and the like.

The color of the viewed object 30 and the like is preferably a single color (in particular, for the viewed objects 30 to 60). The color of the viewed object 30 and the like is, for example, black, white or gray (grayscale). Moreover, the color of the viewed object 30 and the like can be changed to red, blue, green, yellow, cyan, and magenta.

When the display 13 displays the viewed object 30 and the like, it uses a color different from that of the viewed object 30 and the like for the background part (outer peripheral part 13b) other than the object 30 or the like. The background part (outer peripheral part 13b) should be, for example in white, black, or gray (grayscale). In addition, the color of the viewed object 30 and the like should be changeable to red, blue, green, yellow, cyan, and magenta.

The alphabetic letters, Roman numerals or symbols of the viewed objects 30 to 60 may be displayed one by one on the display 13, or a plurality of characters or the like may be displayed simultaneously. However, in a case where a plurality of characters or the like are displayed simultaneously, it is preferable to dispose of or arrange them at random so that inference of the subject does not work.

The viewed objects 30 to 60 are not limited to the alphabetic letters or Roman numerals. They may be Kanji, Hiragana, and Katakana, or other characters of other languages, etc.

Sensory Traits Information Collecting Method

Figure 11:
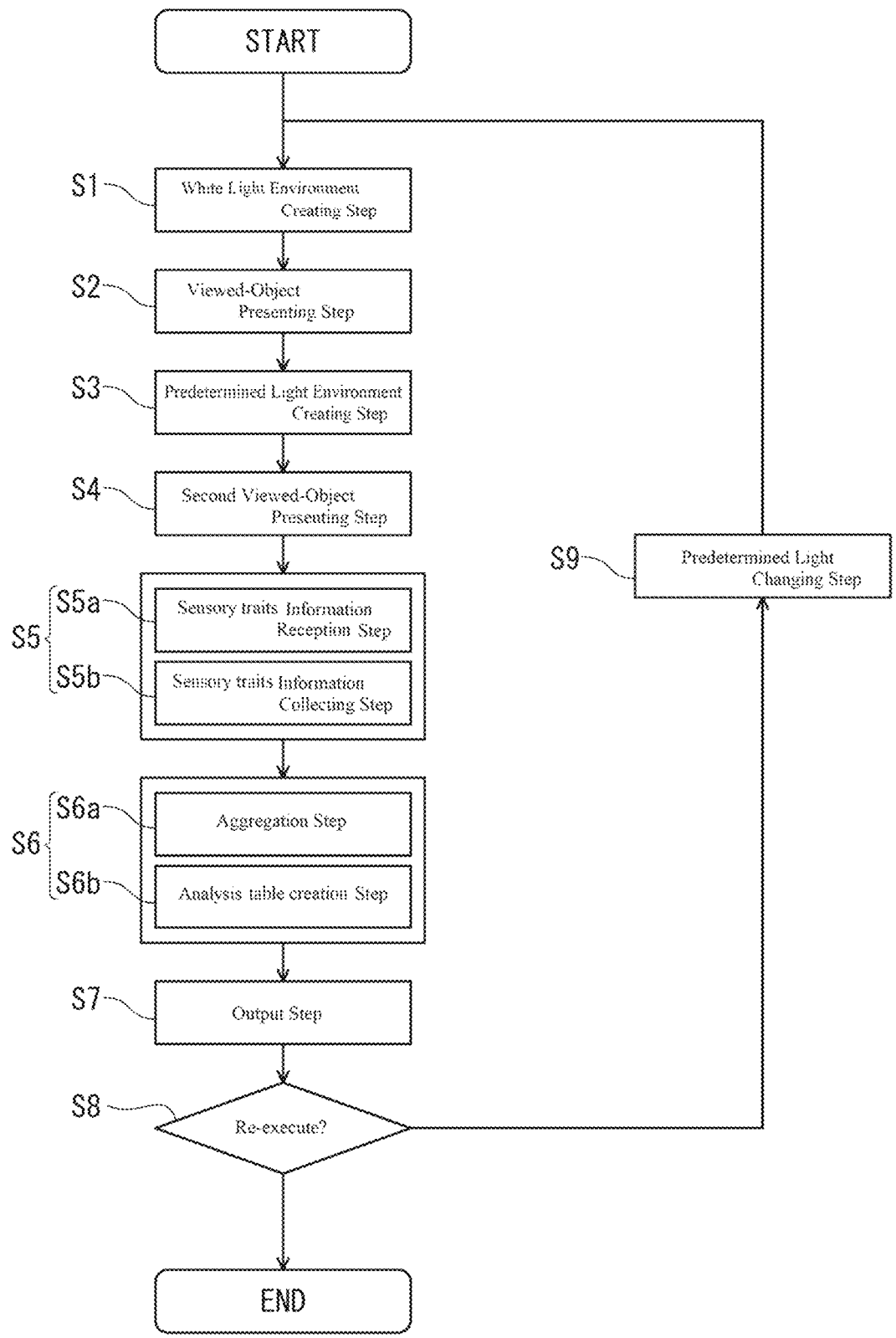
FIG. 11 is a flowchart illustrating the sensory traits information collecting method according to an embodiment.

FIG. 11 is a flowchart diagram sensory traits information collecting method according to an embodiment.

The sensory traits information collecting method includes: a white light environment creating step S1: a viewed-object presenting step S2: a predetermined light environment creating step S3: a second viewed-object presenting step S4: a sensory traits information reception and collecting step S5: an aggregation/analysis step S6; and an output step S7. The method also includes: a re-implementation determination step S8: and a predetermined light-changing step S9.

White Light Environment Creating Step S1

The sensory traits information collecting method is executed in a state where the subject sits in front of the personal computer 10 and can gaze at the display 13. The personal computer 10 is placed in a white light environment in which the white light L0 is incident on the retina R of the subject. A white light environment is created by turning on the indoor lighting device 25 arranged on the ceiling of the room H in which the personal computer 10 is placed.

The sensory traits information collecting program 17 is executed to start the sensory traits information collecting method. The indoor lighting device 25 is turned on (a white light environment is created) by execution of the sensory traits information collecting program 17. The sensory traits information collecting program 17 may also be executed in a state where the indoor lighting device 25 is turned on in advance.

The operation of the personal computer 10 may be performed by the subject, or by an assistant (testing person), or the like.

To allow the subject to acclimate to the white light environment (light adaptation), have the subject stay in the room H where the indoor lighting device 25 is on for at least 1 minute or more (elapse of light adaptation time).

The white light L0 is absorbed to, reflected (diffusely reflected) on, or transmitted through a wall or a floor of the room H, the display 13, and the like, and the reflected light or transmitted light is incident on the retina R of the subject. The white light L0 may be directly incident on the retina R of the subject from the indoor lighting device 25.

Viewed-Object Presenting Step S2

In the viewed-object presenting step S2, at least one or more of the 30 to 80 viewed objects are presented in front of the subject in the white light environment. It is preferable to present three to five types of viewed objects 30 or the like so that the subject does not forget a change in the way of seeing of the viewed object 30 and the like.

The viewed object 30 and the like are displayed on a central part 13a of the display 13. When a plurality of the viewed objects 30 are displayed (presented) on the display 13, the viewed objects 30 and the like are sequentially displayed one by one. The same type of the viewed objects (viewed objects 30, 50, 60) may be displayed by two or three pieces at a time.

It is preferable that each of the viewed objects 30 should be displayed on the display 13 for about 10 seconds at the shortest so that the subject can relax and gaze at the viewed subjects 30 and the like. Hold the image on the display 13 for 10 seconds or more to ensure that the subject is not subjected to flicker stimulation.

Predetermined Light Environment Creating Step S3

In the predetermined light environment creating step S3, a predetermined light environment in which the predetermined light L1 is incident on the retina of the subject is created. The indoor lighting device 25 is turned off, the color light 20 is turned on, and the predetermined light L1 is made to be incident on the retina R of the subject.

As the predetermined light L1 emitted from the color light 20, the light LA, which is colored light, is first selected. That is, it is any one of the yellow light LAY, the magenta light LAM, the cyan light LAC, and the green light LAG. The yellow light LAY is the most preferable for the predetermined light L1 (light LA).

When the predetermined light L1 (light LA) is incident on the retina R of the subject, two or one of the three types of cone cells (L photoreceptor cells VL, M photoreceptor cells VM, and S photoreceptor cells VS) mainly react.

The predetermined light L1 is directly incident on the retina R of the subject from the color light 20. The predetermined light L1 may also be incident on the retina R of the subject as reflection light or transmission light.

When the color light 20 is turned on, the indoor lighting device 25 may be left on.

The white light environment creating step S1 (white light environment) and the predetermined light environment creating step S3 (predetermined light environment) are set so that the luminance (illuminance) of the light incident on the retina R is substantially the same. For example, luminance of 200 to 3000 cd/m² (illuminance of 100 to 1000 lx) suitable for reading, working or the like is preferable.

In order to adapt the subject to the predetermined light environment (light adaptation), the subject is made to stay in front of the personal computer 10 where the color light 20 is on for about 1 minute or more (elapse of light adaptation time).

Second Viewed-Object Presenting Step S4

Subsequently, the viewed object 30 and the like is presented again under the predetermined light environment. In the second viewed-object presenting step S4, the viewed object 30 and the like presented in the first viewed-object presenting step S2 is presented again in front of the subject without any change. The viewed object 30 and the like are displayed again without changing the color, size, display order and display time of the viewed object 30 and the like and without changing the luminance or the like of the display 13.

Hold the image on the display 13 for 10 seconds or more to ensure that the subject is not subjected to flicker stimulation.

Sensory Traits Information Reception and Collecting Step S5

In the sensory traits information reception and collecting step S5, the subject is asked to answer whether or not a change (difference) has occurred in the way of seeing of the viewed object 30 and the like in the white light environment (first viewed-object presenting step S2) and in the predetermined light environment (second viewed-object presenting step S4) (the answer is received), and this information is collected.

The sensory traits information reception and collecting step S5 may be executed in either the white light environment or the predetermined light environment. When returning to the white light environment, the color light 20 is turned off and the indoor lighting device 25 is turned on.

In order to adapt the subject to the white light environment, the subject is made to stay in the room H in which the indoor lighting device 25 is on for about 1 minute or more, and then (after elapse of light adaptation time), receiving of the answer (the sensory traits information reception step S5a) is started.

When the predetermined light L1 (yellow light LAY or the like) is incident on the retina R, a person having a biased visual cognitive function (photosensitivity) may feel that the way of seeing of the viewed object 30 and the like is different from that in the white light environment.

For example, in the predetermined light environment creating step S3, a person having a biased visual cognitive function feels as if the density of color of the viewed object 30 and the like had been increased or the three-dimensional effect of the viewed object 70 had been increased. The person may also feel that the field of view is widened or the glare has been suppressed.

The change in the way of seeing of the viewed object 30 and the like is different depending on a person having a biased visual cognitive function. For example, there are some people whose way of seeing of only the viewed object 30 changes, people whose way of seeing of the viewed object 30 and the viewed object 70 changes, people whose way of seeing of all the viewed objects 30 and the like change, etc.

FIG. 12 is a diagram illustrating an answer form Q.

First, the answer form Q regarding a change in the way of seeing of the viewed object 30 and the like is displayed on the display 13 (the sensory traits information reception step S5a).

As the answer form Q, multiple choices are used (multiple-choice question method). The answers from the subjects are quantified by using the Likert Scale in which each evaluation scale stage of the multiple choices is used as a score. For example, in the case of five choices, "very good" is set to 5 points, "somewhat good" is set to 4 points, "no change" is set to 3 points, "somewhat bad" is set to 2 points, and "very bad" is set to 1 point.

The evaluation scale of the multiple choices is set on the basis of the SD method (Semantic Differential Method) within the psycho-statistical method (psychological measurement method).

The following question items are set for each of the viewed objects 30 to 80 and displayed on the display 13. The contents of each question item (adjective pair, evaluation scale score and the like) are stored in the storage unit 12 in advance.

The following question item and adjective pair are set for the viewed objects 30 to 80.

Question Item 1: Change in entire way of seeing, Adjective pair: "way of seeing became better"—"way of seeing became worse"

The question item 1 is a question regarding whether or not the viewed object 30 could be recognized as a letter or a numeral and whether or not the viewed object 30 was stationary without waving. Moreover, it is a question regarding whether or not the viewed objects 40, 50, 60 could be recognized as a letter or a numeral, that is, whether or not the character or the like could be imaged even with the distortion 41 or the missing parts 51, 61. Furthermore, the question is also related to whether or not the position, the form such as the shape, the direction, and the size, and the positional relationship of the viewed objects 70, 80 to be seen can be more easily recognized.

Furthermore, the following question items and adjective pairs are set for the viewed objects 30 to 80.

Question item 2: Change in field of view, Adjective pair: "It became easier to see around"—"It became harder to see around"

Question Item 3: Change in luminance, Adjective pair: "The entirety became brighter"—"The entirety became darker"

Question item 4: Change in glare, Adjective pair: "The glare became weaker"—"The glare became stronger"

Question Item 5: Change in contrast, Adjective pair: "Became clear"—"Became blurry"

When the viewed objects 30 to 80 are colored, the following question items and adjective pairs are further set.

Question Item 6: Change in brightness, Adjective pair: "Brightness became darker"—"Brightness became lighter"

Question item 7: Change in chroma, Adjective pair: "Color became more vivid"—"Color became duller"

The following question items and adjective pairs are further set for the viewed objects 70, 80.

Question Item 8: Change in a three-dimensional effect, Adjective pair: "Irregularity became deeper"—"Irregularity became shallower"

Question Item 9: Change in texture, Adjective pair: "gloss/shadow became stronger"—"gloss/shadow became weaker"

Subsequently, the subject or the like operates the keyboard 14*a* or the mouse 14*b* to answer the questions about the changes in the way of seeing when viewing the viewed object 30 and the like. Specifically, the subject or the like enter a numerical value with the keyboard 14*a* or click a check button with the mouse 14*b* for each question item to choose the most applicable one of the five choices (single answer method).

For example, the subject answers (inputs numerical values for) the questions about the change in the way of seeing when viewing the viewed object 31 (alphabet "a") displayed on the display 13 in the predetermined light environment.

For the "change in the entire way of seeing" of question item 1, when the subject feels that there was no change, the subject inputs "3".

On the other hand, when the subject feels that there was a change in the "change in the entire way of seeing", the subject inputs as follows. That is, the subject inputs "5" when the way of seeing has become very good and "4" when the way of seeing has become somewhat good. Also, the subject inputs "2" when the way of seeing has become somewhat bad and "1" when the way of seeing has become very bad. That is, with the numerical value "3" as a reference, a larger numerical value means that the way of seeing has become better, and a smaller number means that the way of seeing has become worse.

The subject or the like gives five answers (numerical values) at the minimum and nine answers at the maximum for each of the objects 30 and the like. As a result, a plurality of answers can be obtained to at least one or more viewed objects 30 and the like (sensory traits information collecting step S5*b*).

The answers (raw data of the sensory traits information on the sense of sight) on each of the viewed objects 30 and the like are stored (collected) in the storage unit 12.

Aggregation/Analysis Step S6

In the aggregation/analysis step S6, first, the answer information obtained in the sensory traits information reception and collecting step S5 is aggregated, and presence/absence and a degree of the change in the way of seeing of the subject (aggregated information of the sensory traits information on the sense of sight) are acquired (aggregation step S6*a*).

Specifically, the arithmetic processing unit 11 executes arithmetic processing on the answers (numerical values) stored in the storage unit 12 and calculates aggregated information such as, for example, an average value, a mode value, a maximum value, a minimum value, a variance value, or a deviation. Moreover, a frequency at which each numerical value is input (answered) is calculated. The frequency at which a numerical value other than "3" is input (answered), the frequency at which "1" or "2" is input, and the frequency at which "4" or "5" is input are calculated.

Figure 13:
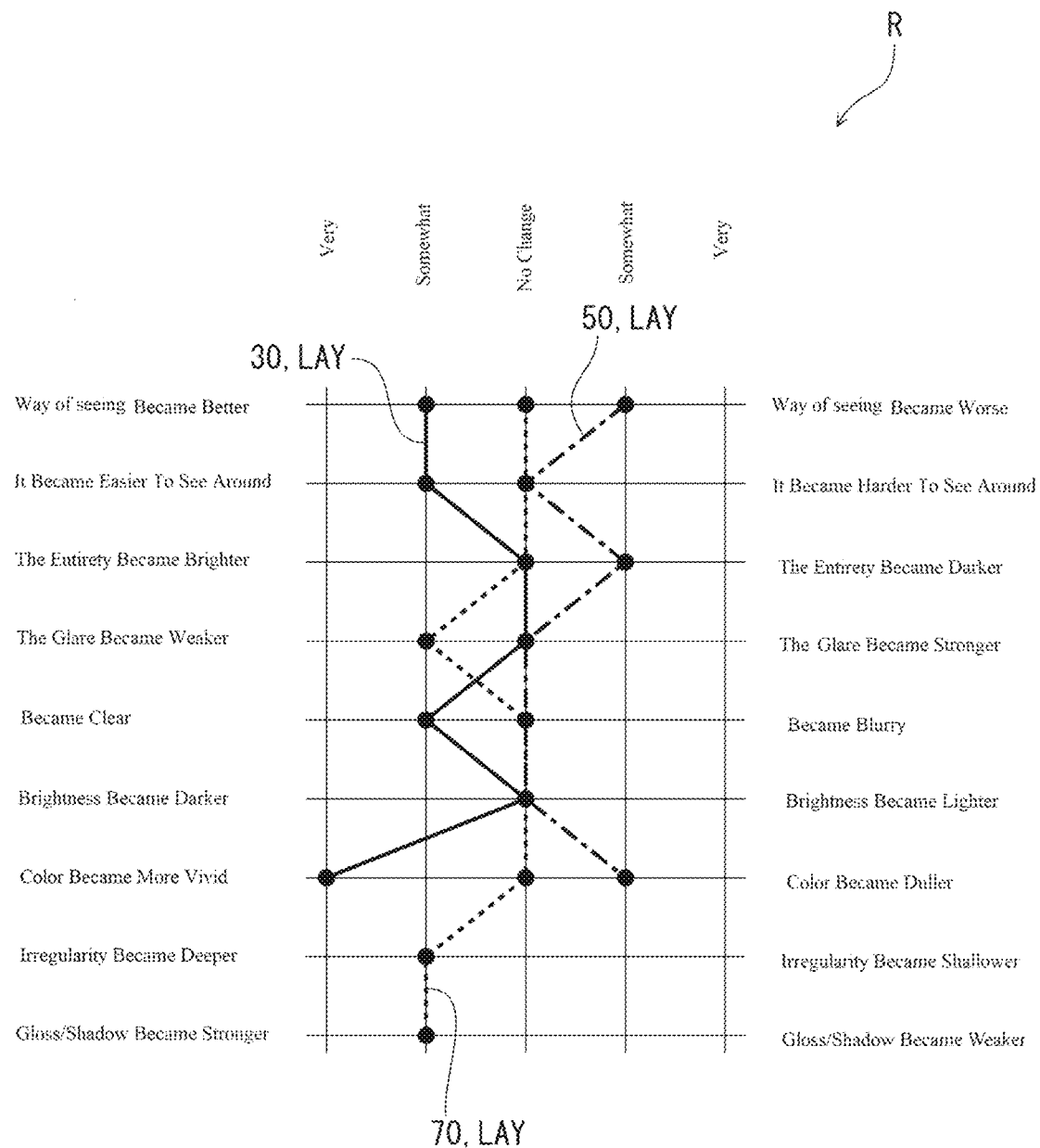
FIG. 13 is a diagram illustrating an SD chart analysis table R.

FIG. 13 is a diagram illustrating an SD chart analysis table R. FIG. 13 is an example in which sensory traits information on the way of seeing of the viewed objects 30, 50, 80, when the yellow light LAY is used, is displayed in a chart.

Subsequently, the arithmetic processing unit 11 creates an analysis table (analysis information of the sensory traits information on the sense of sight) in which the question items and the answers (numerical values) are graphed and charted (analysis table creation step S6*b*). Specifically, the arithmetic processing unit 11 executes arithmetic processing on the aggregated information and creates analysis information (output image) such as the SD chart analysis table R.

In addition to the SD chart analysis table R, the arithmetic processing unit 11 may create an analysis table such as a pie chart, a laser chart or a matrix.

Based on the information obtained in the aggregation step S6*a* or the analysis table created in the analysis table creation step S6*b*, an analysis process (diagnostic process) of analyzing the sensory traits related to the visual sensation of the subject may be performed.

Outputting Step S7

Finally, in the outputting step S7, the aggregated information and the analysis information (results of various types of arithmetic processing) obtained in the aggregation/analysis step S6 are output to the outside. The arithmetic processing unit 11 displays the aggregated information and the analysis information on the display 13 as the degree of the change in the way of seeing for the subject (sensory traits information on the sense of sight). The aggregated information and the analysis information may be printed out by a printer 16.

Specifically, as the aggregated information, an average value, a mode value, a variance value or the like is output, for example. Moreover, an analysis table such as the SD chart is output as the analysis information.

Re-Implementation Step S8

In the re-implementation step S8, it is determined whether the aforementioned sensory traits information collecting method will be re-executed or not.

For example, when the way of seeing of the subject with respect to the viewed object 30 or the like is hardly changed, the sensory traits information collecting method is executed again. In other words, it is determined whether to implement the sensory traits information collecting method would be executed again based on the aggregated information acquired in the aggregation/analysis step S6.

Specifically, the determination is made based on the frequency of the input of the numerical values other than "3" in the aggregated information. When the frequency is less than a threshold value (for example, 10%), the sensory traits information collecting method is executed again. On the other hand, when the frequency is equal to or more than the threshold value (for example, 10%), the sensory traits information collecting method is terminated. This threshold value can be arbitrarily set.

For example, it is determined whether the sensory traits information collecting method is executed again or not based on the number of types of the predetermined light L1 used in the predetermined light environment creating step S3.

The number of types of the predetermined light L1 that can be emitted from the color light 20 is stored in advance, and the sensory traits information collecting method is executed again until the number of times of the execution of the predetermined light environment creating step S3 matches the number of types of the predetermined light L1.

Specifically, in a case where, for example, five types of the predetermined light L1 can be emitted from the color light 20, if the predetermined light environment creating process S3 is executed less than five times, the sensory traits information collecting method is executed again. On the other hand, when the number of times of the executions of the light-environment creating step S3 reaches five, the sensory traits information collecting method is terminated. The number of types of the predetermined light L1 that can be emitted from the color light 20 can be arbitrarily set.

Predetermined Light Changing Step S9

When it is determined that the sensory traits information collecting method is to be re-executed, in the predetermined-light changing step S9, the irradiation light (the predetermined light L1, light LA) of the color light 20 is changed from the yellow light LAY to, for example, the magenta light LAM.

Then, in the predetermined light environment creating step S3, the magenta light LAM or the like is emitted to the subject from the color light 20. In the predetermined light environment creating step S3, the subject is allowed to stay in front of the PC 10 with the color light 20 on for about 1 minute or longer (after the light adaptation time has elapsed) so that the subject adapts to the changed predetermined light L1 (new predetermined light environment).

Subsequently, the second viewed-object presenting step S4 to the outputting step S7 are executed.

In the re-execution of the sensory traits information collecting method, the white light environment creating step S1 and the viewed-object presenting step S2 may be omitted or may be re-executed.

In the predetermined-light changing step S9, the light LA may be changed from the yellow light LAY to the cyan light LAC, the green light LAG, or the like. The order (priority order) of the four lights LA (the yellow light LAY, the magenta light LAM, the cyan light LAC, and the green light LAG) can be set arbitrarily.

Depending on the characteristics and the like of the subject's impairment, the gray light (light LB) or the gray colored light (light LBA) may be used in addition to or instead of the colored light (light LA) as the predetermined light L1 emitted from the color light 20.

When the light LB and LBA are used, only the color light 20 is turned on at the luminance of 0.001 to 5 cd/m$^2$ in the room H in the predetermined light environment creating step S3. The luminance of the display 13 is also changed to 0.001 to 5 cd/m$^2$.

When the light LB and LBA are used, in order to adapt the subject to the predetermined light environment (dark adaptation), the subject is made to stay for about 10 to 30 minutes in front of the personal computer 10 in which the color light 20 is on (elapse of dark adaptation time).

When the gray light (light LB) or the gray colored light (light LBA) is incident on the retina R, a person having a biased visual cognitive function may feel that glare has been suppressed, for example. Depending on the subject, the way of seeing of the viewed object 30 and the like may also change. In a case where the gray colored light (light LBA) is incident on the retina R, the subject may feel that the same change has been made in the way of seeing when the colored light (light LA) is incident.

By following the aforementioned steps, the sensory traits information on the visual cognitive of the subject can be collected without relying on a person having specialized knowledge or the like and with excluding subjectivity of the subject as much as possible. Moreover, the sensory traits information on the visual cognitive of the subject can be aggregated and analyzed.

The way of seeing of the viewed object 30 and the like is strongly influenced by the photosensitivity of the subject. In a case of a bias in the photosensitivity (presence/absence, strong/weak, variation of hypersensitivity/hypoesthesia to light or color or the like), the way of seeing of the characters, three-dimensional objects and the like are supposed to be different from that of a healthy person. Although, in many cases, the way of seeing itself is not something the subject is aware of. However, if the way of seeing changes, the subject can be aware of (actualize) it.

Thus, in the sensory traits information collecting method and the sensory traits information collecting device 1 according to the embodiment of the present invention, an environment is created in which the "the way of seeing" of a person having a biased visual cognitive function (photosensitivity) is likely to change, and the viewed object 30 and the like is presented whose "the way of seeing" is likely to change after the adaptation time has elapsed.

Then, the "sensory traits information on the sense of sight" related to the mode/degree of the change in the "the way of seeing" is collected from the subject. At this time, the degree/mode of the change in the way of seeing are quantified and collected by using a psycho-statistical method (the SD method or the like).

Therefore, the "sensory traits information on the sense of sight" of the subject can be collected objectively and quantitatively.

Moreover, the "sensory traits information on the sense of sight" of the subject is aggregated, analyzed and output. As a result, basic data for early diagnosis or the like of a biased visual cognitive function (photosensitivity) of the subject can be provided. Therefore, a training method for effectively improving/and correcting the bias of the visual cognitive function of a person having a biased visual cognitive function (photosensitivity) can be created and executed.

Thus, the sensory traits information collecting device 1 and the sensory traits information collecting method using the device 1 can be supplied inexpensively and easily in a wide range of fields including various industries, education, and traffic safety.

The present invention is not limited to the aforementioned embodiments but includes various modifications of the aforementioned embodiments without departing from the gist of the present invention. That is, the specific shapes, configurations and the like described in the embodiments are only examples and can be changed as appropriate.

The sensory traits information collecting method of the present invention is not limited to those using the sensory traits information collecting device 1. It is sufficient if the viewing objects 30 to 80 including the prescribed visibility elements are presented in front of the subject and the degree of change in the way of seeing of the viewing objects 30 to 80 in the white light environment and in the predetermined light environment can be collected, etc.

The sensory traits information collecting device 1 is not limited to the desktop personal computer 10, but a laptop personal computer or a notebook personal computer may be used. As the sensory traits information collecting device 1, a tablet terminal, a smartphone or a mobile terminal may be used. The color light 20 may be a flashlight (light for camera photographing) of a tablet terminal, a smartphone or the like.

The indoor lighting device (first optical portion) 25 is not limited to a ceiling light. It may be a floor light, a desk light, a handy light or the like.

The white light L0 may be emitted from the color light 20 in the room H in which natural light is blocked. That is, in place of the indoor lighting device 25, the color light 20 may also function as the first optical portion (a light source of the white light environment creating step S1).

The white light L0 is not limited to artificial light emitted from various lighting fixtures but may be natural light (sunlight). For example, the personal computer 10 may be placed in an environment in which the natural light enters the room through a window without using the indoor lighting device 25 or the like. That is, the sensory traits information collecting device 1 may not include the indoor lighting device (first optical portion) 25.

The white light environment only needs to be an environment in which the subject can gaze at an image displayed on the display 13 without any trouble (without feeling glare or the like). The outdoor natural light (sunlight) is preferably avoided because it has high luminance and the stimulus is too strong for the subject in many cases.

The color light 20 (second optical portion) is not limited to a desk light. It may be a ceiling light, a floor light or the like.

The white color environment and the predetermined light environment may be created, respectively, by changing the lighting color of the indoor lighting device 25 from white (white light L0) to yellow or the like (predetermined light L1). That is, the indoor lighting device 25 may also function as the second optical portion (a light source of the predetermined light environment creating step S3).

The predetermined light L1 is not limited to artificial light emitted from various lighting fixtures, but natural light (sunlight) may be used. For example, the window pane in the room may be colored or a color filter may be attached to the window pane to create a predetermined light environment in the room H.

Instead of the color light 20, a color lens glasses or the like may be used. For example, yellow lens glasses, pink (magenta) lens glasses, sky blue (cyan) lens glasses, green lens glasses, or gray lens glasses can be used. The density of each color lens is preferably 10% to 50% (10F to 50F). The density of each color lens may be also from 50% to 85% (50F to 85F).

The color lenses having different colors may be used by being stacked. The form of the color lens is not limited to color lens glasses but may be contact lenses, goggles or the like.

Moreover, the light L may be emitted from the color light 20 toward the subject wearing the gray lens glasses. As a result, the gray colored light LBA can be incident on the retina R of the subject.

The second optical portion may be either a wearable optical device (glasses or the like) and a non-wearable optical device (a lamp, a lighting device or the like). The wearable optical device and the non-wearable optical device may be mixed.

The display 13 of the personal computer 10 may be used as the first optical portion and the second optical portion. That is, instead of the color light 20 and the room lighting device 25, or in addition to the color light 20 and the room lighting device 25, the display 13 may also function as the first optical portion (the light source of the white-light environment creating process S1) or the second optical portion (the light source of the predetermined light environment creating process S3).

The white light L0 or the predetermined light L1 is emitted from the display 13. For example, the entire background other than the viewed object 30 and the like displayed on the display 13 is changed from white (white light L0) to yellow or the like (predetermined light L1). For example, the central part 13a of the display 13 is set to white (white light L0), and only the outer peripheral part 13b is changed from white to yellow or the like (predetermined light L1).

The central part 13a is a display region (a region centralized the viewed object 30) in which the viewed object 30 and the like is displayed, and the outer peripheral part 13b is a display region along a frame of the display 13. The outer peripheral part 13b may be both left and right edges, both upper and lower edges, four corners or the like of the display 13.

In addition to the yellow light LAY, the magenta light LAM, the cyan light LAC, and the green light LAG, red or blue light, for example, may be used as the predetermined light L1 (light LA).

In addition to the gray light LB and the gray colored light LBA, light from which the light having a wavelength of 500 nm or less is cut or light from which the light having a wavelength of 400 nm or less is cut (anti-glare glasses) may be used.

The predetermined light L1 is not limited to that being incident only on the peripheral visual field region R2 in the retina R of the subject. The predetermined light L1 may be incident on the entire region (the central visual field region R1 and the peripheral visual field region R2) of the retina R, or only on the central visual field region R1.

The viewed-object presenting portion is not limited to the display 13 but may be a projector, the printer 16, a 3D printer or the like. That is, actual bodies of the viewed objects 30 to 80 may be presented in front of the subject.

The output portion is not limited to the display 13 but may be the printer 16.

The case in which the viewed object 30 and the like is presented again after the predetermined light environment creating step S3 (second viewed-object presenting step S4) has been described above, but the present invention is not limited thereto. The white light environment may be changed to the predetermined light environment during the viewed-object presenting step S2. For example, the color light 20 may be turned on so as to change the white light environment to the predetermined light environment while the subject is gazing at the viewed object 70.

The outputting step S7 does not always have to be executed after each aggregation/analysis step S6. In the sensory traits information collecting method using a plurality of predetermined lights L1, the aggregation/analysis step S6 may be executed several times, and the outputting step S7 may be executed only once at the end.

REFERENCE NUMERALS

1 Sensory traits Information Collecting Device
10 Personal Computer
11 Arithmetic Processing Unit (Collecting Portion, Aggregation/Analysis Portion)
12 Storage Unit
13 Display (Viewed-Object Presenting Portion, Output Portion, First Optical Portion, Second Optical Portion)
13a Central Part
13b Outer Peripheral Part
14a Keyboard (Information Receiving Portion)
14b Mouse (Information Receiving Portion)
15 I/O
16 Printer
17 Sensory traits Information Collecting Program
18 Viewed-Object Data Base
20 Color Light (Second Optical Portion, First Optical Portion)
25 Indoor Lighting Device (First Optical Portion, Second Optical Portion)
30 Viewed Object 31 Counter (Predetermined Visibility Element)
32 Aperture (Predetermined Visibility Element)
33 Joint (Predetermined Visibility Element)
34 Apex (Predetermined Visibility Element)
35 Vertex (Predetermined Visibility Element)
36 Crotch (Predetermined Visibility Element)
40 Viewed Object
41 Distortion (Predetermined Visibility Element)
50 Viewed Object
51 Missing Part (Predetermined Visibility Element)
60 Viewed Object
61 Missing Part (Predetermined Visibility Element)
70 Viewed Object
71 Golf Ball (Viewed Object)
72 Irregularity (Predetermined Visibility Element)
73 Blind Curtain (Viewed Object)
74 Shadow (Predetermined Visibility Element)
80 Three-Dimensional Object (Viewed Object)
81 Texture (Surface Property, Predetermined Visibility Element)
L0 White Light
L1 Predetermined Light
LA Colored Light (Predetermined Light)
LAY Yellow Light (Predetermined Light)
LAM Magenta Light (Predetermined Light)
LAC Cyan Light (Predetermined Light)
LAG Green Light (Predetermined Light)
LB Gray Light (Predetermined Light)
LBA Gray Colored Light (Predetermined Light)
LBY Gray-Yellow Light (Predetermined Light)
LBM Gray-Magenta Light (Predetermined Light)
LBC Gray-Cyan Light (Predetermined Light)
LBG Gray-Green Light (Predetermined Light)
R Retina
R1 Central Visual-Field Region
R2 Peripheral Visual-Field Region
VL L Photoreceptor Cell (Long Cone Cell)
VM M Photoreceptor Cell (Middle Cone Cell)
VS S Photoreceptor Cell (Short Cone Cell)
VR R Photoreceptor Cell (Rod Cell)
H Room
Q Answer Form

The invention claimed is:

1. A sensory traits information collecting method, comprising:
a first viewed-object presenting step of presenting one or more viewed objects including a predetermined visibility element to a subject in a white light environment in which white light is incident on a retina of the subject;
a predetermined light environment creating step of creating a predetermined light environment in which predetermined light different from the white light in at least one of spectral distribution and luminance is incident on the retina of the subject;
a second viewed-object presenting step of presenting the viewed object to the subject again in the predetermined light environment;
an information reception step of receiving from the subject sensory traits information related to the way of seeing of the viewed object in the first viewed-object presenting step and the second viewed-object presenting step; and
a collecting step of collecting the sensory traits information received from the subject,
wherein, in the information reception step and the collecting step, the sensory traits information is quantified by using a Likert scale in a multiple-choice question method.

2. The sensory traits information collecting method according to claim 1, comprising an aggregation step of aggregating the information obtained in the collecting step.

3. The sensory traits information collecting method according to claim 2, comprising an analysis step of creating an analysis table on the basis of the information obtained in the aggregation step.

4. The sensory traits information collecting method according to claim 1, wherein an Semantic Differential (SD) method of a psychostatistical method is used for the multiple-choice question method.

5. The sensory traits information collecting method according to claim 1, wherein the predetermined light is yellow light having a dominant wavelength of 570 to 590 nm.

6. The sensory traits information collecting method according to claim 1, wherein the predetermined light is magenta light having a complementary dominant wavelength of 500 to 570 nm.

7. The sensory traits information collecting method according to claim 1, wherein the predetermined light is cyan light having a dominant wavelength of 470 to 530 nm.

8. The sensory traits information collecting method according to claim 1, wherein the predetermined light is green light having a dominant wavelength of 500 to 570 nm.

9. The sensory traits information collecting method according to claim 1, wherein the predetermined light has luminance of 0.001 to 5 cd/m$^2$.

10. The sensory traits information collecting method according to claim 1, wherein, in the predetermined light environment creating step, the predetermined light is incident on a peripheral visual field region of the retina.

11. The sensory traits information collecting method according to claim 1, wherein:
the viewed object is a letter, a number, or a symbol; and
the predetermined visibility element is any one or more of a counter, an aperture, a joint, an apex, a vertex, and a crotch in the letter, the number, or the symbol.

12. The sensory traits information collecting method according to claim 1, wherein:
the viewed object is a letter, a number, or a symbol displayed on a curved surface; and
the predetermined visibility element is distortion in the letter, the number, or the symbol.

13. The sensory traits information collecting method according to claim 1, wherein:
the viewed object is a digitally-displayed letter, number or symbol; and
the predetermined visibility element is a missing part in the letter, the number, or the symbol.

14. The sensory traits information collecting method according to claim 1, wherein:
the viewed object is a dot-displayed letter, number or symbol; and
the predetermined visibility element is a missing part in the letter, the number, or the symbol.

15. The sensory traits information collecting method according to claim 1, wherein:
the viewed object is a three-dimensional object; and
the predetermined visibility element is irregularity on a surface of the three-dimensional object.

16. The sensory traits information collecting method according to claim 1, wherein:

the viewed object is a three-dimensional object; and the predetermined visibility element is a texture on a surface of the three-dimensional object.

17. The sensory traits information collecting method according to claim 1, wherein at least one of spectral distribution and luminance of the predetermined light is changed, and then the steps from the predetermined light environment creating step to the collecting step are executed again.

18. A sensory traits information collecting device, comprising:
- a first optical portion which creates a white light environment in which white light is incident on a retina of a subject;
- a second optical portion which creates a predetermined light environment in which predetermined light different from the white light in at least one of spectral distribution and luminance is incident on the retina of the subject;
- a viewed-object presenting portion which presents one or more viewed objects including a predetermined visibility element to the subject in the white light environment and then presents the viewed object to the subject in the predetermined light environment again;
- an information receiving portion which receives sensory traits information related to the way of seeing of the viewed object in the white light environment and the predetermined light environment from the subject; and
- a collecting portion which collects the sensory traits information received by the information receiving portion,
- wherein the information receiving portion and the collecting portion process information obtained by quantifying the sensory traits information by using a Likert scale in a multiple-choice question method.

19. The sensory traits information collecting device according to claim 18, comprising an aggregation/analysis portion which executes various types of arithmetic processing on the basis of the collected information obtained from the collecting portion.

20. The sensory traits information collecting device according to claim 19, comprising an output portion which outputs a result of the various types of arithmetic processing.

* * * * *